(12) United States Patent
Liu et al.

(10) Patent No.: US 12,566,412 B2
(45) Date of Patent: Mar. 3, 2026

(54) DEPOSITION THICKNESS DRIFT COMPENSATION IN SUBSTRATE PROCESSING SYSTEMS

(71) Applicant: Applied Materials, Inc., Santa Clara, CA (US)

(72) Inventors: Albert Liu, Fullerton, CA (US); Mitesh Harshad Sanghvi, Dublin, CA (US); Venkatanarayana Shankaramurthy, San Jose, CA (US); Yulian Yao, Santa Clara, CA (US); Xinhai Han, Palo Alto, CA (US)

(73) Assignee: Applied Materials, Inc., Santa Clara, CA (US)

( * ) Notice: Subject to any disclaimer, the term of this patent is extended or adjusted under 35 U.S.C. 154(b) by 400 days.

(21) Appl. No.: 18/113,342

(22) Filed: Feb. 23, 2023

(65) Prior Publication Data

US 2024/0288838 A1 Aug. 29, 2024

(51) Int. Cl.
*G05B 13/02* (2006.01)
*G05B 13/04* (2006.01)

(52) U.S. Cl.
CPC ....... *G05B 13/0265* (2013.01); *G05B 13/042* (2013.01)

(58) Field of Classification Search
CPC .............. G05B 13/0265; G05B 13/042; G05B 19/41875; G05B 2219/45031; H01J 37/32926; H01L 22/20
USPC ........................................ 700/28
See application file for complete search history.

(56) References Cited

U.S. PATENT DOCUMENTS

| | | | |
|---|---|---|---|
| 6,589,871 B2 | 7/2003 | Kawamura et al. | |
| 2020/0405146 A1 | 12/2020 | Cao et al. | |
| 2021/0394338 A1* | 12/2021 | Nakamura | G06F 18/214 |
| 2023/0088435 A1* | 3/2023 | Kobayashi | G03F 7/0002 438/689 |
| 2023/0359179 A1* | 11/2023 | Sanghvi | G05B 19/418 |

FOREIGN PATENT DOCUMENTS

| | | |
|---|---|---|
| KR | 20140064989 A | 5/2014 |
| KR | 20220132614 A | 9/2022 |

OTHER PUBLICATIONS

International Search Report and Written Opinion for International Application No. PCT/US2023/035332, mailed Feb. 19, 2024, 09 Pages.

* cited by examiner

*Primary Examiner* — Jigneshkumar C Patel
(74) *Attorney, Agent, or Firm* — Lowenstein Sandler LLP

(57) ABSTRACT

A method includes identifying a material associated with a substrate processing operation of a recipe. The method further includes determining an expected total residual thickness value subsequent to the substrate processing operation. The method further includes determining, based on the expected total residual thickness value, an expected material thickness value of the material associated with the substrate processing operation. The method further includes updating the recipe based on the material and the expected material thickness value of the material to generate an updated recipe. The method further includes causing a substrate to be processed based on the updated recipe.

20 Claims, 5 Drawing Sheets

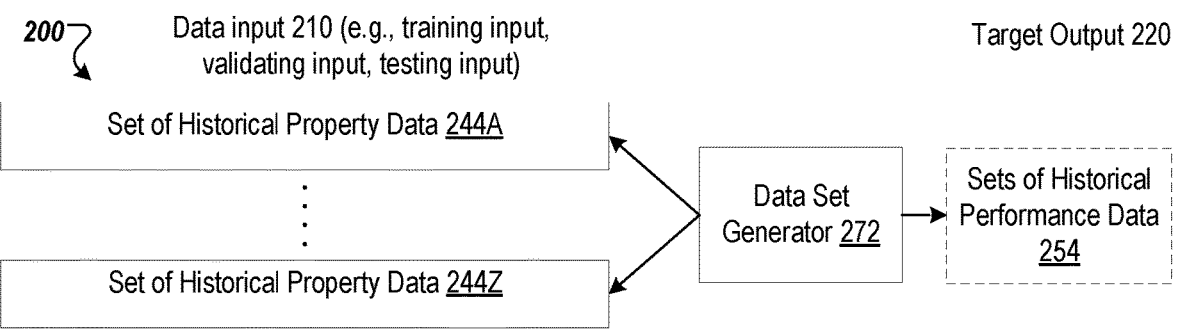

*200*

Data input 210 (e.g., training input, validating input, testing input)

Target Output 220

Set of Historical Property Data 244A

⋮

Set of Historical Property Data 244Z

Data Set Generator 272

Sets of Historical Performance Data 254

FIG. 2

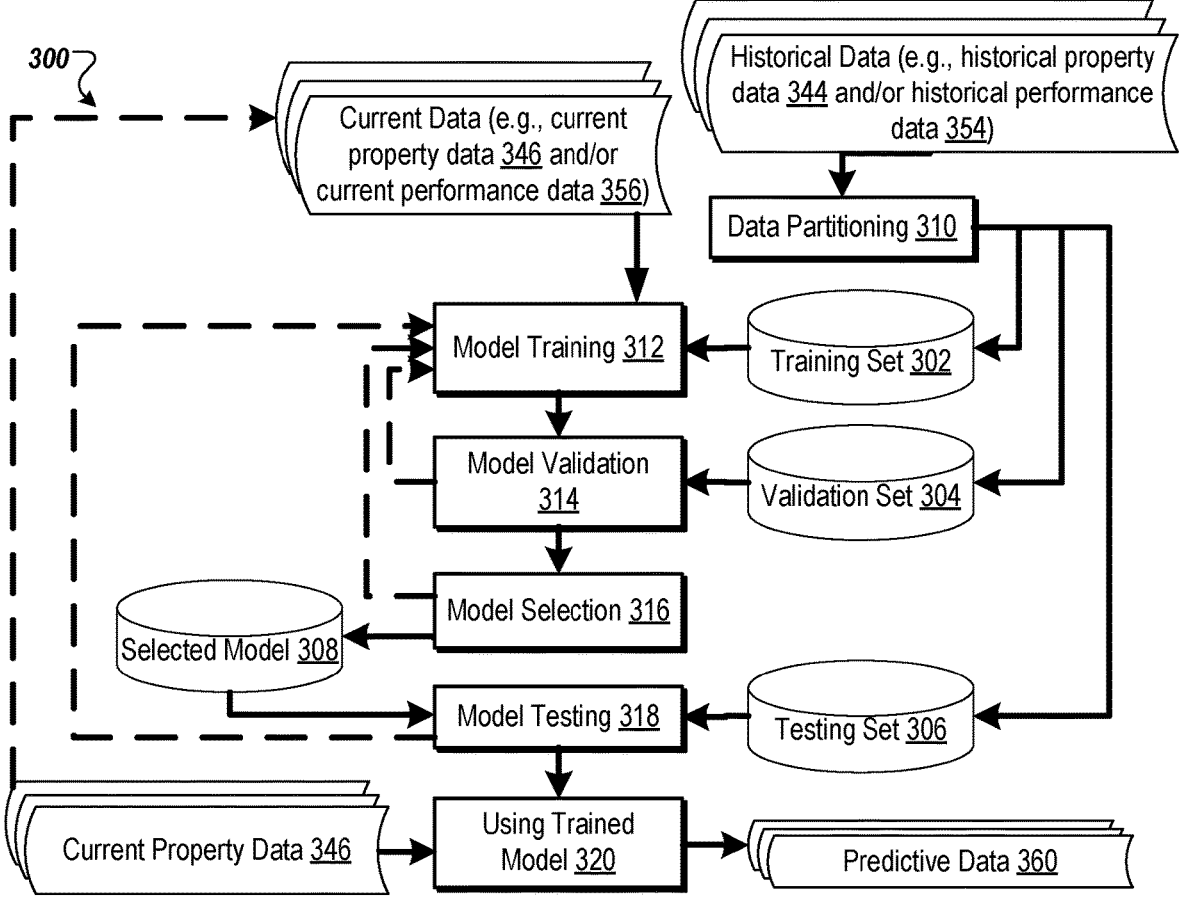

*300*

Current Data (e.g., current property data 346 and/or current performance data 356)

Historical Data (e.g., historical property data 344 and/or historical performance data 354)

Data Partitioning 310

Model Training 312

Training Set 302

Model Validation 314

Validation Set 304

Model Selection 316

Selected Model 308

Model Testing 318

Testing Set 306

Current Property Data 346

Using Trained Model 320

Predictive Data 360

FIG. 3

DEPOSITION THICKNESS DRIFT COMPENSATION IN SUBSTRATE PROCESSING SYSTEMS

TECHNICAL FIELD

The present disclosure relates to compensation, and, more particularly, to residual thickness compensation during substrate manufacturing.

BACKGROUND

Products can be produced by performing one or more manufacturing processes using manufacturing equipment. For example, substrate processing equipment can be used to produce substrates via substrate processing operations.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An aspect of the disclosure includes a method including identifying a material associated with a substrate processing operation of a recipe. The method further includes determining an expected total residual thickness value subsequent to the substrate processing operation. The method further includes determining, based on the expected total residual thickness value, an expected material thickness value of the material associated with the substrate processing operation. The method further includes updating the recipe based on the material and the expected material thickness value of the material to generate an updated recipe. The method further includes causing a substrate to be processed based on the updated recipe.

A further aspect of the disclosure includes a non-transitory computer-readable storage medium comprising instructions that, when executed by a processing device operatively coupled to a memory, performs operations. The operations include identifying a material associated with a substrate processing operation of a recipe. The operations further include determining an expected total residual thickness value subsequent to the substrate processing operation. The operations further include determining, based on the expected total residual thickness value, an expected material thickness value of the material associated with the substrate processing operation. The operations further include updating the recipe based on the material and the expected material thickness value of the material to generate an updated recipe. The operations further include causing a substrate to be processed based on the updated recipe.

A further aspect of the disclosure includes a system including a memory and a processing device coupled to the memory. The processing device is to identify a material associated with a substrate processing operation of a recipe. The processing device is further to determine an expected total residual thickness value subsequent to the substrate processing operation. The processing device is further to determine, based on the expected total residual thickness value, an expected material thickness value of the material associated with the substrate processing operation. The processing device is further to update the recipe based on the material and the expected material thickness value of the material to generate an updated recipe. The processing device is further to cause a substrate to be processed based on the updated recipe.

BRIEF DESCRIPTION OF THE DRAWINGS

The present disclosure is illustrated by way of example, and not by way of limitation in the figures of the accompanying drawings.

FIG. 2 illustrates a data set generator associated with residual thickness compensation, according to certain embodiments.

FIG. 3 is a block diagram illustrating determining predictive data associated with residual thickness compensation, according to certain embodiments.

DETAILED DESCRIPTION

Figure 1:
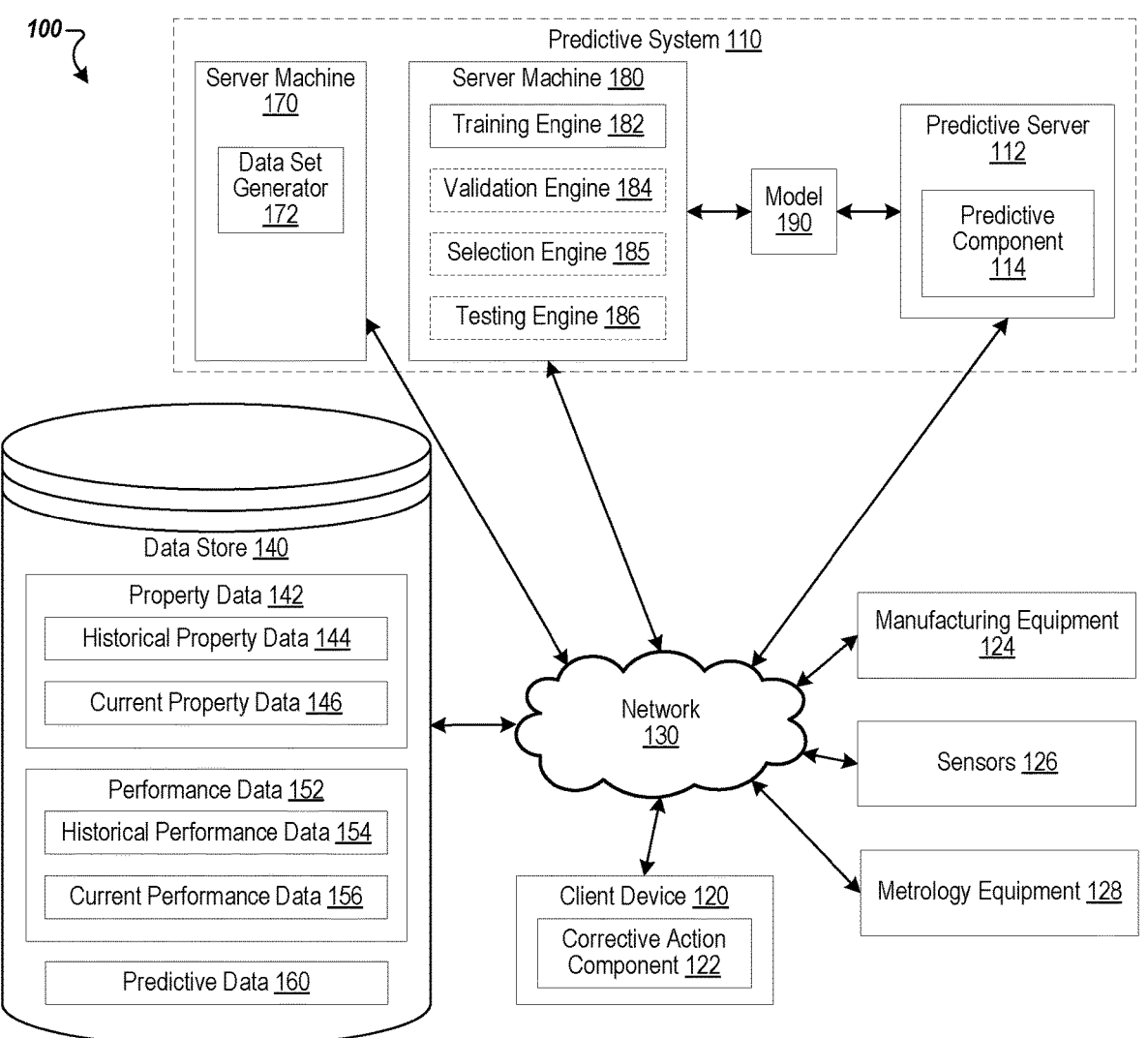
FIG. 1 is a block diagram illustrating an example system architecture, according to certain embodiments.

Described herein are technologies directed to residual thickness compensation (e.g., adjustment of film deposition parameters based on residual thickness during substrate manufacturing, scalable run-time software methodology for compensating deposition thickness drift based on chamber residual thickness, chamber residual-based loop time adjustment).

Manufacturing equipment, according to a process recipe, can deposit a film on the surface of a substrate. The manufacturing equipment can deposit multiple layers of film on the surface of the substrate and can perform an etch process to form the pattern in the deposited film. For example, manufacturing equipment can perform a chemical vapor deposition (CVD) process to deposit alternative layers on the substrate. The film can include one or more layers of materials that are formed during the deposition process, and each layer can include a particular thickness gradient (e.g., changes in the thickness along a layer of the deposited film). For example, a first layer can be formed directly on the surface of the substrate (referred to as a proximal layer or proximal end of the film) and have a first thickness. After the first layer is formed on the surface of the substrate, a second layer having a second thickness can be formed on the first layer. This process continues until the deposition process is completed and a final layer is formed for the film (referred to as the distal layer or distal end of the film).

The film can be subjected to, for example, an etch process to form a pattern on the surface of the substrate, a chemical-mechanical polishing (CMP) process to smooth the surface of the film, or any other process to manufacture the finished substrate. An etch process can include exposing highly energetic process gas (e.g., a plasma) with a sample surface to break down the materials at the surface, which can then be removed by a vacuum system.

A processing chamber can perform each substrate manufacturing process (e.g., the deposition process, the etch process, the polishing process, etc.) according to a process recipe. A process recipe defines a particular set of operations to be performed for the substrate during the process and can include one or more settings associated with each operation.

For example, a deposition process recipe can include a temperature setting for the processing chamber, a pressure setting for the processing chamber, a flow rate setting for a precursor for a material included in the film deposited on the substrate surface, etc. Accordingly, the thickness of each film layer can be correlated to these processing chamber settings.

The film can include alternating layers of different materials. For example, the film can include alternating layers of oxide and nitride layers (oxide-nitride-oxide-nitride stack or ONON stack), alternating oxide and polysilicon layers (oxide-polysilicon-oxide-polysilicon stack or OPOP stack), and so forth. Each set of alternating layers can be referred to as a loop. For example, a film can include 40 loops (e.g., 40 sets of oxide-Nitride layers) where the thickness of the layers of some loops can be different than those of other loops. For example, a film stack can include 40 oxide-nitride loops (e.g., 80 layers, alternating 40 layers of oxide and 40 layers of nitride), where the first loop of the film stack has an oxide layer of a first thickness and a nitride layer of a second thickness, then next nine loops of the film stack having oxide layers of a third thickness and nitride layers of a fourth thickness, and the final 30 loops of the film stack having oxide layers of a fifth thickness and nitride layers of a sixth thickness.

The film can also include layers of different materials with varying (non-alternating) patterns (e.g., an oxide-nitride-nitride-oxide stack or ONNO, an oxide-nitride-oxide-oxide stack or ONOO, etc.). During this substrate manufacturing process, due to continuously changing deposition parameters and variations in processing chamber conditions (e.g., build-up of contaminant, residual thickness on the walls of the processing chamber, erosion on certain components, etc.), the thickness of each loop can vary (drift). The variations in layer thickness can cause the gas distribution plate to be nearer or farther from the surface of the substrate, thus affecting the plasma flow and/or temperature, and causing further deformations to the film.

In some manufacturing systems, these variations are compensated by manually increasing or decreasing the deposition time of subsequent loops to maintain a desired overall thickness of the film stack. For example, if the first loop has a greater thickness than required by the process recipe, a technician can manually decrease the deposition time of the second loop in the process recipe to generate a thinner loop than required by the process recipe. Processing chambers can have multiple substrate processing areas or slots. After a deposition operation, the deposition drift (e.g., caused in part by different residual thicknesses on walls of each substrate processing area) can vary for each individual substrate processing area (e.g., slot) within a single processing chamber. Compensating for these variations between substrate processing areas is also generally performed by manually increasing or decreasing the deposition time of subsequent layers to maintain a desired overall thickness of the film stack. However, such processes are not scalable, error prone, and time consuming. Such processes can also result in delays in manufacturing, loss of throughput, defects in the film, inconsistent and abnormal products, unscheduled user time or down time, and defective products. Such processes also cause a significant increase in the time needed to perform an optimization of the parameters of a process recipe.

Aspects and implementations of the present disclosure address these and other shortcomings of the existing technology by performing residual thickness compensation, such as by adjusting film deposition parameters based on residual thickness during substrate manufacturing (e.g., compensating for deposition thickness drift based on chamber residual thickness).

A processing device identifies a material associated with a substrate processing operation of a recipe. In some examples, the processing device determines that the substrate processing operation is going to deposit nitride on the substrate. In some examples, the processing device determines that the substrate processing operation is going to deposit oxide on the substrate. In some examples, the processing device determines that the substrate processing operation is going to deposit a conductor (e.g., copper, tungsten, etc.) on the substrate.

The processing device determines an expected total residual thickness value subsequent to the substrate processing operation. The expected total residual thickness value may be an expected total residual thickness value on the substrate and/or on the walls of the processing chamber responsive to the substrate processing operations of the recipe up until the end of the current substrate processing operation.

The processing device determines, based on the expected total residual thickness value, an expected material thickness value (e.g., of the current substrate processing operation) of the material associated with the substrate processing operation. In some embodiments, the expected material thickness value is a difference between a desired material thickness value and an actual material thickness value. In some embodiments, to determine the expected material thickness value, the processing device is to provide the expected total residual thickness value as input to a trained machine learning model. In some embodiments, to determine the expected material thickness value, the processing device is to receive, from the trained machine learning model, output associated with predictive data, material thickness value is associated with the predicted data. In some embodiments, the trained machine learning model is trained with a data input including historical total residual thickness values and target output of historical material thickness values.

The processing device updates the recipe based on the material and the expected material thickness value of the material to generate an updated recipe. In some embodiments, to update the recipe, the processing device is to determine an updated time value associated with the substrate processing operation. In some embodiments, the processing device is to determine the updated time value associated with the substrate processing operation based on a time value associated with the substrate processing operation, the expected total residual thickness value, and the expected material thickness value. In some embodiments, the updating of the recipe includes determining at least one of an updated radio frequency (RF) power of the substrate processing operation, an updated spacing value of the substrate processing operation, an updated gas flow value of the substrate processing operation, or an updated chamber pressure value of the substrate processing operation.

The processing device causes a substrate to be processed based on the updated recipe.

Aspects of the present disclosure result in technological advantages. Aspects of the present disclosure avoid the time consuming and error prone process of manually calculating "operation time offsets" for each loop and feeding the offsets into tables. Aspects of the present disclosure are scalable. Aspects of the present disclosure avoid the resulting delays in manufacturing, the loss of throughput and/or defects in the film. Aspects of the present disclosure result in significant reduction in time needed to perform an optimization of the parameters of a process recipe. The present disclosure can also result in generating diagnostic data and performing corrective actions to avoid inconsistent and abnormal products, and unscheduled user time or down time. Aspects of the present disclosure allow for deposition drift compensation based on material type.

FIG. 1 is a block diagram illustrating an exemplary system 100 (exemplary system architecture), according to certain embodiments. The system 100 (e.g., via corrective action component 122 and/or predictive component 114) can perform the methods described herein (e.g., methods 400A-C of FIGS. 4A-C). The system 100 includes a client device 120, manufacturing equipment 124, sensors 126, metrology equipment 128, a predictive server 112, and a data store 140. In some embodiments, the predictive server 112 is part of a predictive system 110. In some embodiments, the predictive system 110 further includes server machines 170 and 180.

In some embodiments, one or more of the client device 120, manufacturing equipment 124, sensors 126, metrology equipment 128, predictive server 112, data store 140, server machine 170, and/or server machine 180 are coupled to each other via a network 130 for generating predictive data 160 to perform residual-based adjustment of film deposition parameters during substrate manufacturing. In some embodiments, network 130 is a public network that provides client device 120 with access to the predictive server 112, data store 140, and other publicly available computing devices. In some embodiments, network 130 is a private network that provides client device 120 access to manufacturing equipment 124, sensors 126, metrology equipment 128, data store 140, and other privately available computing devices. In some embodiments, network 130 includes one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

In some embodiments, the client device 120 includes a computing device such as Personal Computers (PCs), laptops, mobile phones, smart phones, tablet computers, netbook computers, etc. In some embodiments, the client device 120 includes a corrective action component 122. In some embodiments, the corrective action component 122 may also be included in the predictive system 110 (e.g., machine learning processing system). In some embodiments, the corrective action component 122 is alternatively included in the predictive system 110 (e.g., instead of being included in client device 120). Client device 120 includes an operating system that allows users to one or more of consolidate, generate, view, or edit data, provide directives to the predictive system 110 (e.g., machine learning processing system), etc.

In some embodiments, corrective action component 122 receives one or more of user input (e.g., via a Graphical User Interface (GUI) displayed via the client device 120), property data 142, performance data 152, etc. In some embodiments, property data 142 may be expected total residual thickness values, expected material thickness values, etc. In some embodiments, the corrective action component 122 transmits data (e.g., user input, property data 142, performance data 152, etc.) to the predictive system 110, receives predictive data 160 from the predictive system 110, determines a corrective action based on the predictive data 160, and causes the corrective action to be implemented. In some embodiments, the corrective action component 122 stores data (e.g., user input, property data 142, performance data 152, etc.) in the data store 140 and the predictive server 112 retrieves the data from the data store 140. In some embodiments, the predictive server 112 stores output (e.g., predictive data 160) of the trained machine learning model 190 in the data store 140 and the client device 120 retrieves the output from the data store 140. In some embodiments, the corrective action component 122 receives an indication of a corrective action (e.g., based on predictive data 160) from the predictive system 110 and causes performance of the corrective action.

Manufacturing equipment 124 can produce products, such as substrates, wafers, semiconductors, electronic devices, etc., following a recipe or performing runs over a period of time. Manufacturing equipment 124 can include a processing chamber. Processing chambers can be adapted to carry out any number of processes on substrates. A same or different substrate processing operation can take place in each processing chamber or substrate processing area. A substrate processing operation can include atomic layer deposition (ALD), physical vapor deposition (PVD), chemical vapor deposition (CVD), etching, annealing, curing, pre-cleaning, metal or metal oxide removal, or the like. Other processes can be carried out on substrates therein. Processing chambers can include one or more sensors configured to capture data for a substrate before, after, or during a substrate processing operation. For example, the one or more sensors can be configured to capture spectral data and/or non-spectral data for a portion of a substrate during a substrate processing operation. In other or similar embodiments, the one or more sensors can be configured to capture data associated with the environment within a processing chamber before, after, or during the substrate processing operation. For example, the one or more sensors can be configured to capture data associated with a temperature, a pressure, a gas concentration, etc. of the environment within a processing chamber during the substrate processing operation.

A processing chamber can be used for processes in which a material is deposited on a substrate. For example, the processing chamber can be a chamber for a deposition process, as previously described. In some embodiments, the processing chamber includes a chamber body and a showerhead that encloses an interior volume. The showerhead can include a showerhead base and a showerhead gas distribution plate. Alternatively, the showerhead can be replaced by a lid and a nozzle in some embodiments, or by multiple pie shaped showerhead compartments and plasma generation units in other embodiments. The chamber body can be fabricated from aluminum, stainless steel or other suitable material such as titanium (Ti). The chamber body generally includes sidewalls and a bottom. An exhaust port can be defined in the chamber body and can couple the interior volume to a pump system. The pump system can include one or more pumps and throttle valves utilized to evacuate and regulate the pressure of the interior volume of the processing chamber.

The showerhead can be supported on the sidewall of the chamber body. The showerhead (or lid) can be opened to allow access to the interior volume of the processing chamber and can provide a seal for the processing chamber while closed. A gas panel can be coupled to the processing chamber to provide process and/or cleaning gases to the interior volume through the showerhead or lid and nozzle (e.g., through apertures of the showerhead or lid and nozzle). For example. gas panel can provide precursors for materials of a film deposited on a surface of a substrate. In some embodiments, a precursor can include a silicon-based precursor or a boron-based precursor. The showerhead can include a gas distribution plate (GDP) and can have multiple gas delivery holes (also referred to as channels) throughout the GDP. A substrate support assembly is disposed in the interior volume of the processing chamber below the showerhead. The substrate support assembly holds a substrate during processing (e.g., during a deposition process) using, for example, electrostatic chuck.

In some embodiments, a processing chamber can include metrology equipment (e.g., metrology equipment 128) and/or sensors (e.g., sensors 126) configured to generate in-situ metrology measurement values (e.g., metrology data) and/or sensor measurement values (e.g., sensor data) during a process performed at processing chamber. In some embodiments, metrology measurement values and/or sensor measurement values may be a subset of property data 142 and/or performance data 152. The metrology equipment and/or sensors can be operatively coupled to the system controller. In some embodiments, the metrology equipment can be configured to generate a metrology measurement value (e.g., a thickness) for a film during particular instances of the deposition process. In some embodiments, the sensors can be configured to generate a sensor measurement value (e.g., a thickness) for a film during particular instances of the deposition process. The system controller can generate a thickness profile for a film based on the received metrology measurement values from the metrology equipment. The system controller can generate a thickness profile for a film based on the received sensor measurement values from the sensors. In other or similar embodiments, processing chamber does not include metrology equipment. In such embodiments, the system controller can receive one or more metrology measurement values for a film after completion of the deposition process at the processing chamber. The system controller can determine a deposition rate based on the one or more metrology measurement values and can associate generate the thickness profile for the film based on the determined concentration gradient and the determined deposition rate of the deposition process.

Manufacturing equipment 124 can perform a process on a substrate (e.g., a wafer, etc.) at the processing chamber. Examples of substrate processes include a deposition process to deposit one or more layers of film on a surface of the substrate, an etch process to form a pattern on the surface of the substrate, etc. Manufacturing equipment 124 can perform each process according to a process recipe. A process recipe defines a particular set of operations to be performed on the substrate during the process and can include one or more settings associated with each operation. For example, a deposition process recipe can include a temperature setting for the processing chamber, a pressure setting for the processing chamber, a flow rate setting for a precursor for a material included in the film deposited on the substrate surface, etc.

In some embodiments, manufacturing equipment 124 includes sensors 126 that are configured to generate data associated with a substrate processed at manufacturing system 100. For example, a processing chamber can include one or more sensors configured to generate a residual thickness profile (e.g., thickness of material on processing chamber walls) associated with the processing chamber before, during, and/or after a process (e.g., a deposition process). For example, a processing chamber can include one or more sensors configured to generate spectral or non-spectral data associated with the substrate before, during, and/or after a process (e.g., a deposition process) is performed for the substrate. In some embodiments, spectral data generated by sensors 126 can indicate a concentration of one or more materials deposited on a surface of a substrate. Sensors 126 configured to generate spectral data associated with a substrate can include reflectometry sensors, ellipsometry sensors, thermal spectra sensors, capacitive sensors, and so forth. Sensors 126 configured to generate non-spectral data associated with a substrate can include residual thickness sensors, temperature sensors, pressure sensors, flow rate sensors, voltage sensors, etc.

Metrology equipment 128 can provide metrology data associated with substrates processed by manufacturing equipment 124. In some embodiments, metrology data may be a subset of property data 142 and/or performance data 152. The metrology data can include a value of film property data (e.g., wafer spatial film properties), dimensions (e.g., thickness, height, etc.), dielectric constant, dopant concentration, density, defects, etc. In some embodiments, the metrology data can further include a value of one or more types of surface profile property data (e.g., an etch rate, an etch rate uniformity, a critical dimension of one or more features included on a surface of the substrate, a critical dimension uniformity across the surface of the substrate, an edge placement error, etc.). The metrology data can be of a finished or semi-finished product. The metrology data can be different for each substrate. Metrology data can be generated using, for example, reflectometry techniques, ellipsometry techniques, transmission electron microscopy (TEM) techniques, and so forth.

In some embodiments, the predictive server 112, server machine 170, and server machine 180 each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

The predictive server 112 includes a predictive component 114. In some embodiments, the predictive component 114 identifies (e.g., receive from the client device 120, retrieve from the data store 140) property data 142 (e.g., expected total residual thickness values, expected material thickness values, etc.) and generates predictive data 160 associated with performance of a corrective action (e.g., updating of recipes, updating of deposition operation parameters, updating of process operation parameters, etc.). In some embodiments, the predictive component 114 uses one or more trained machine learning models 190 to determine the predictive data 160. In some embodiments, trained machine learning model 190 is trained using historical property data 144 and historical performance data 154.

For example, the deposition operation parameters can include deposition time for each layer and/or loop of the process recipe, a temperature setting for the processing chamber, a pressure setting for the processing chamber, a flow rate setting for a precursor for a material included in the film deposited on the substrate surface, a showerhead height, etc. In some embodiments, updating of the recipe includes updating deposition operation parameters. For example deposition operation parameters may include time values, updated time values, recipes, updated recipes, RF power of the substrate processing operation, a spacing value of the substrate processing operation, a gas flow value of the substrate processing operation, or a chamber pressure value of the substrate processing operation, updated RF power of the substrate processing operation, an updated spacing value of the substrate processing operation, an updated gas flow value of the substrate processing operation, an updated chamber pressure value of the substrate processing operation, etc.

In some embodiments, the predictive system 110 (e.g., predictive server 112, predictive component 114) generates predictive data 160 using supervised machine learning (e.g., supervised data set, historical property data 144 labeled with historical performance data 154, etc.). In some embodiments, the predictive system 110 generates predictive data 160 using semi-supervised learning (e.g., semi-supervised data set, performance data 152 is a predictive percentage, etc.). In some embodiments, the predictive system 110 generates predictive data 160 using unsupervised machine learning (e.g., unsupervised data set, clustering, clustering based on historical property data 144, etc.).

In some embodiments, the manufacturing equipment 124 (e.g., deposition chamber, cluster tool, wafer backgrind systems, wafer saw equipment, die attach machines, wirebonders, die overcoat systems, molding equipment, hermetic sealing equipment, metal can welders, deflash/trim/form/ singulation (DTFS) machines, branding equipment, lead finish equipment, and/or the like) is part of a substrate processing system (e.g., integrated processing system). The manufacturing equipment 124 includes one or more of a controller, an enclosure system (e.g., substrate carrier, front opening unified pod (FOUP), autoteach FOUP, process kit enclosure system, substrate enclosure system, cassette, etc.), a side storage pod (SSP), an aligner device (e.g., aligner chamber), a factory interface (e.g., equipment front end module (EFEM)), a load lock, a transfer chamber, one or more processing chambers, a robot arm (e.g., disposed in the transfer chamber, disposed in the front interface, etc.), and/or the like. The enclosure system, SSP, and load lock mount to the factory interface and a robot arm disposed in the factory interface is to transfer content (e.g., substrates, process kit rings, carriers, validation wafer, etc.) between the enclosure system, SSP, load lock, and factory interface. The aligner device is disposed in the factory interface to align the content. The load lock and the processing chambers mount to the transfer chamber and a robot arm disposed in the transfer chamber is to transfer content (e.g., substrates, process kit rings, carriers, validation wafer, etc.) between the load lock, the processing chambers, and the transfer chamber. In some embodiments, the manufacturing equipment 124 includes components of substrate processing systems. In some embodiments, the property data 142 of a processing chamber or a substrate results from the processing chamber or substrate undergoing one or more processes performed by components of the manufacturing equipment 124 (e.g., deposition, etching, heating, cooling, transferring, processing, flowing, etc.).

In some embodiments, the sensors 126 provide property data 142 (e.g., sensor values, such as historical sensor values and current sensor values) of the processing chamber (e.g., expected total residual thickness) or of a substrate (e.g., expected material thickness) processed by manufacturing equipment 124.

In some embodiments, the sensors 126 include one or more of a metrology tool such as ellipsometers (used to determine the properties and surfaces of thin films by measuring material characteristics such as layer thickness, optical constants, surface roughness, composition, and optical anisotropy), ion mills (used to prepare heterogeneous bulk materials when wide areas of material are to be uniformly thin), capacitance versus voltage (C-V) systems (used to measure the C-V and capacitance versus time (C-t) characteristics of semiconductor devices), interferometers (used to measure distances in terms of wavelength, and to determine wavelengths of particular light sources), source measure units (SME) magnetometers, optical and imaging systems, profilometers, wafer probers (used to test a semiconductor wafer before it is separated into individual dies or chips), imaging stations, critical-dimension scanning electron microscope (CD-SEM, used to ensure the stability of the manufacturing process by measuring critical dimensions of substrates), reflectometers (used to measure the reflectivity and radiance from a surface), resistance probes (used to measure the resistivity of thin-films), resistance high-energy electron diffraction (RHEED) system (used to measure or monitor crystal structure or crystal orientation of epitaxial thin-films of silicon or other materials), X-ray diffractometers (used to unambiguously determine crystal structure, crystal orientation, film thickness and residual stress in silicon wafers, epitaxial films, or other substrates), and/or the like.

In some embodiments, the property data 142 is used for equipment health and/or product health (e.g., product quality). In some embodiments, the property data 142 is received over a period of time.

In some embodiments, sensors 126 and/or metrology equipment 128 provide property data 142 including one or more of morphology data, size attribute data, dimensional attribute data, image data, scanning electron microscope (SEM) images, energy dispersive x-ray (EDX) images, defect distribution data, spatial location data, elemental analysis data, wafer signature data, chip layer, chip layout data, edge data, grey level data, signal to noise data, temperature data, spacing data, electrical current data, power data, voltage data, and/or the like.

In some embodiments, property data includes morphology data (e.g., data that relates to the form of a substrate, such as thickness of deposition layers or residual thickness). In some embodiments, property data 142 includes size attribute data (e.g., data describing the size of attributes of a substrate). In some embodiments, property data 142 includes dimensional attribute data (e.g., data that describes the dimensions of attributes of a substrate). In some embodiments, property data 142 includes SEM images (e.g., images captured by a scanning electron microscope using a focused beam of electrons to scan a surface of a substrate to create a high-resolution image). In some embodiments, property data 142 includes EDX images (e.g., images generated from data that is collected using an x-ray technique to identify the elemental composition of materials). In some embodiments, property data 142 includes defect distribution data (e.g., data that describes the distribution, such as spatial, temporal, etc., of defects on a substrate). In some embodiments, property data 142 includes spatial location data (e.g., data that describes the spatial location of attributes, defects, elements, etc. of a substrate). In some embodiments, property data 142 includes elemental analysis data (e.g., data that describes the elemental composition of a substrate). In some embodiments, property data 142 includes wafer signature data (e.g., data that describes distribution of wafer defects of a substrate originating from a single manufacturing problem). In some embodiments, property data 142 includes chip layer data (e.g., associated with a layer or operation in the substrate manufacturing process). In some embodiments, property data 142 includes chip layout data (e.g., data that describes the layout of a substrate is terms of planar geometric shapes). In some embodiments, property data 142 includes edge data (e.g., data that describes the edge of a wafer, such as chipped edges, wafer edge thickness, wafer bow and/or warp etc.). In some embodiments, property data 142 includes grey level data (e.g., data that describes the brightness of a pixel of an image of a substrate) and signal to noise data (e.g., data that describes the signal to noise ratio of a substrate measure with, for example, spectrometry equipment).

In some embodiments, the property data 142 (e.g., historical property data 144, current property data 146, etc.) is processed (e.g., by the client device 120 and/or by the predictive server 112). In some embodiments, processing of the property data 142 includes generating features. In some embodiments, the features are a pattern in the property data 142 (e.g., slope, width, height, peak, etc.) or a combination of values from the property data 142 (e.g., power derived from voltage and current, etc.). In some embodiments, the property data 142 includes features that are used by the predictive component 114 for obtaining predictive data 160.

In some embodiments, metrology equipment 128 can be included as part of the manufacturing equipment 124. For example, metrology equipment 128 can be included inside of or coupled to a processing chamber and configured to generate metrology data (e.g., property data 142, performance data 152, etc.) for the interior of a processing chamber or a substrate before, during, and/or after a process (e.g., a deposition process, an etch process, etc.) while the substrate remains in the processing chamber. In some instances, metrology equipment 128 can be referred to as in-situ metrology equipment. In another example, metrology equipment 128 can be coupled to another station of manufacturing equipment 124. For example, metrology equipment can be coupled to a transfer chamber, a load lock, or a factory interface.

In some embodiments, sensors 126 can be included as part of the manufacturing equipment 124. For example, sensors 126 can be included inside of or coupled to a processing chamber and configured to generate sensor data for the interior of a processing chamber or a substrate before, during, and/or after a process (e.g., a deposition process, an etch process, etc.) while the substrate remains in the processing chamber. In some instances, sensors 126 can be referred to as in-situ sensors. In another example, sensors 126 can be coupled to another station of manufacturing equipment 124. For example, sensors can be coupled to a transfer chamber, a load lock, or a factory interface.

In some embodiments, the metrology equipment 128 (e.g., ellipsometry equipment, imaging equipment, spectroscopy equipment, etc.) is used to determine metrology data (e.g., inspection data, image data, spectroscopy data, ellipsometry data, material compositional, optical, or structural data, etc.) corresponding to the interior (e.g., surfaces) of the processing chamber or to substrates produced by the manufacturing equipment 124 (e.g., substrate processing equipment). In some examples, after the manufacturing equipment 124 processes substrates, the metrology equipment 128 is used to inspect portions (e.g., layers) of the substrates and/or the interior of the processing chamber. In some embodiments, the metrology equipment 128 performs scanning acoustic microscopy (SAM), ultrasonic inspection, x-ray inspection, and/or computed tomography (CT) inspection. In some examples, after the manufacturing equipment 124 deposits one or more layers on a substrate, the metrology equipment 128 is used to determine quality of the processed substrate (e.g., thicknesses of the layers, uniformity of the layers, interlayer spacing of the layer, and/or the like). In some embodiments, the metrology equipment 128 includes an imaging device (e.g., SAM equipment, ultrasonic equipment, x-ray equipment, CT equipment, and/or the like). In some embodiments, property data 142 includes sensor data from sensors 126 and/or metrology data from metrology equipment 128. In some embodiments, property data 142 includes sensor data from sensors 126 and/or metrology data from metrology equipment 128 located in-situ (inside the processing chamber). In some embodiments, performance data 152 includes user input via client device 120 and/or metrology data from metrology equipment 128. Property data 142 may include metrology data from a first subset of the metrology equipment 128 and performance data 152 may include metrology data from a second subset of the metrology equipment 128.

In some embodiments, performance data 152 may be associated with performance of a recipe (e.g., deposition recipe, updated recipe, etc.). For example, performance data 152 may be of substrates or processing chambers that have undergone the recipe and/or the processing operations of the recipe.

In some embodiments, the property data 142 may be derived from metrology data and/or sensor data. Metrology data may be data describing metrology of a substrate. Sensor data may be data describing conditions and characteristics inside a processing chamber. In some embodiments, property data may include a deposition thickness value (e.g., an actual or expected amount of material deposited on the substrate). In some embodiments, property data may include a total residual thickness value (e.g., an actual or expected amount of material residually deposited on the chamber walls). In some embodiments, the deposition thickness value is derived from the deposition operation recipe (e.g., the deposition thickness is equal to the expected deposition thickness of the deposition operation).

In some embodiments, an actual deposition thickness value or an actual residual thickness value may refer to the amount of material actually deposited on a substrate or residually deposited on the processing chamber walls following a deposition operation. The actual deposition thickness value or an actual total residual thickness value may be measured using metrology equipment or sensors.

In some embodiments, an expected deposition thickness value or an expected residual thickness value may refer to the amount of material that is expected to be deposited on a substrate or residually deposited on the processing chamber walls following a deposition operation. In some embodiments, the expected deposition thickness value or an actual total residual thickness value may be derived from a process recipe (e.g., deposition operation parameters). In some embodiments, the expected deposition thickness value or an actual residual thickness value may be derived from historical actual thickness values (e.g., on the substrate and/or the walls of the processing chamber) corresponding to the same deposition operation.

In some embodiments, the data store 140 is memory (e.g., random access memory), a drive (e.g., a hard drive, a flash drive), a database system, or another type of component or device capable of storing data. In some embodiments, data store 140 includes multiple storage components (e.g., multiple drives or multiple databases) that span multiple computing devices (e.g., multiple server computers). In some embodiments, the data store 140 stores one or more of property data 142, performance data 152, and/or predictive data 160.

Property data 142 may include expected total residual thickness values, expected material thickness values, actual total residual thickness values, actual material thickness values, desired total residual thickness values, and desired material thickness values, etc. Performance data 152 may include expected total residual thickness values, expected material thickness values, actual total residual thickness values, actual material thickness values, desired total residual thickness values, and desired material thickness values, etc.

In some embodiments, data store 140 can store expected total residual thickness values and expected material thickness values. Expected total residual thickness values can include one or more data points associated with an expected residual film profile expected to be produced by a certain process recipe. In some embodiments, expected total residual thickness values can include the desired thickness of the film, the desired thickness of one or more layers of the film, and/or the desired thickness of one or more loops of the film, etc. The expected material thickness values can include one or more data points associated with the current film thickness generated by the manufacturing equipment 124. For example, the expected material thickness values can include the expected thickness of the film, the expected thickness of one or more layers of the film, and/or the expected thickness of one or more loops of the film, etc. For example, the expected material thickness values can include the measured thickness of the film, the measured thickness of one or more layers of the film, and/or the measured thickness of one or more loops of the film, etc. The expected material thickness values can be measured using metrology equipment 128. The updated recipe can include one or more adjustments or offsets to be applied to the parameters of the processing chamber or the process recipe. For example, the updated recipe can include an adjustment to the deposition time for a film layer and/or a loop, the temperature setting for the processing chamber, the pressure setting for the processing chamber, the flow rate setting for a precursor for a material included in the film deposited on the substrate surface, to the power supplied to the processing chamber, to the ratio of two or more settings, etc. The updated recipes can be generated by comparing the expected total residual thickness (e.g., the residual thickness expected to be generated by the process recipe), and determining, using an algorithm, a library of known fault patterns, etc., the adjustment to be applied to the parameters of the process recipe to achieve the expected material thickness. The updated recipes can be applied to steps associated with the deposition process, the etch process, etc.

In some embodiments, data store 140 can be configured to store data associated with known fault patterns. A fault pattern can be a one or more values (e.g., a vector, a scalar, etc.) associated with one or more issues or failures associated with a processing chamber sub-system. In some embodiments, a fault pattern can be associated with a corrective action. For example, a fault pattern can include parameter adjustment steps to correct the issue or failure indicated by the fault pattern. For example, the predictive system can compare a determined fault pattern to a library of known fault patterns to determine the type of failure experienced by a sub-system, the cause of the failure, the recommended corrective action to correct the fault, and so forth.

In some embodiments, the corrective action may be, for example, updating a recipe (e.g., process recipe, deposition recipe), determining an expected material thickness value, causing a substrate to be processed based on an updated recipe, training a machine learning model using data input comprising historical residual thickness values and target output comprising historical performance data, using a trained machine learning model to receive output associated with predictive data, where the expected material thickness value is associate with the predictive data, and/or the like. In some embodiments, updating the process recipe may include updating process parameters (e.g., deposition time, flow rate, temperature, etc.) In some embodiments, the corrective action includes providing machine learning (e.g., causing updating of recipes, updating of process/operation parameters, etc. based on the predictive data 160).

In some embodiments, the predictive data 160 is associated with a corrective action. In some embodiments, a corrective action is associated with one or more of updating a recipe (e.g., process recipe, deposition recipe), determining an expected material thickness value, causing a substrate to be processed based on an updated recipe, training a machine learning model using data input comprising historical residual thickness values and target output comprising historical performance data, using a trained machine learning model to receive output associated with predictive data, repairing one or more portions of the manufacturing equipment 124, replacing one or more portions of the manufacturing equipment 124, Computational Process Control (CPC), Statistical Process Control (SPC) (e.g., SPC to compare to a graph of 3-sigma, etc.), Advanced Process Control (APC), model-based process control, preventative operative maintenance, design optimization, updating of manufacturing parameters, wafer recipe modification, feedback control, machine learning modification, and/or the like.

In some embodiments, data store 140 can be configured to store data that is not accessible to a user of the manufacturing system. For example, process data, spectral data, contextual data, etc. obtained for a substrate being processed at the manufacturing system is not accessible to a user (e.g., an operator) of the manufacturing system. In some embodiments, all data stored at data store 140 can be inaccessible by the user of the manufacturing system. In some embodiments, a portion of data stored at data store 140 can be inaccessible by the user while another portion of data stored at data store 140 can be accessible by the user. In some embodiments, one or more portions of data stored at data store 140 can be encrypted using an encryption mechanism that is unknown to the user (e.g., data is encrypted using a private encryption key). In some embodiments, data store 140 can include multiple data stores where data that is inaccessible to the user is stored in one or more first data stores and data that is accessible to the user is stored in one or more second data stores.

Property data 142 includes historical property data 144 and current property data 146. In some embodiments, property data 142 (e.g., sensor data) may include expected total residual thickness values, expected material thickness values, updated RF power of a substrate processing operation, an updated spacing value of a substrate processing operation, an updated gas flow value of a substrate processing operation, an updated chamber pressure value of a substrate processing operation, deposition residual thickness data (actual), pressure data, temperature data, temperature range, power data, comparison parameters for comparing inspection data with threshold data, threshold data, cooling rate data, cooling rate range, and/or the like. In some embodiments, at least a portion of the property data 142 is from sensors 126 and/or metrology equipment 128.

Performance data 152 includes historical performance data 154 and current performance data 156. Performance data 152 may be indicative of whether a substrate is properly designed, is properly produced, has uniformity with the other substrates and/or is properly functioning. Performance data 152 may be indicative of whether a substrate processing operation is accurately carried out. For example, performance data 152 may be indicative of an actual thickness deposited on the wafer or in the processing chamber (e.g., material thickness values, total residual thickness values, historical material thickness values, deposition thickness on walls of the processing chamber, etc.) during a deposition operation. Performance data 152 may be indicative of whether a substrate processing operation (e.g., deposition operation) is carried out effectively. For example, performance data 152 may be indicative of deposition drift before, during, or after a deposition operation and may indicate a deposition residual thickness value, material thickness value, etc.

In some embodiments, at least a portion of the performance data 152 is associated with a quality of substrates produced by the manufacturing equipment 124. In some embodiments, at least a portion of the performance data 152 is based on metrology data from the metrology equipment 128 (e.g., historical performance data 154 includes metrology data indicating properly processed substrates, property data of substrates, yield, material thickness value, etc.) or sensors 126 (e.g., historical performance data 154 includes sensor data indicating properly processed substrates, property data of substrates, yield, material thickness value, etc.). In some embodiments, at least a portion of the performance data 152 is based on inspection of the substrates or interior of the processing chamber (e.g., current performance data 156 based on actual inspection). In some embodiments, performance data 152 includes user input (e.g., via client device 120) indicating a quality of the substrates or deposition drift in a processing chamber/substrate processing areas or on a substrate. In some embodiments, the performance data 152 includes an indication of an absolute value (e.g., inspection data of the substrates indicates missing the threshold data by a calculated value, drift value misses the threshold drift value by a calculated value) or a relative value (e.g., inspection data of the film deposition indicates missing the threshold data by 5%, drift value misses threshold drift value by 5%). In some embodiments, the performance data 152 is indicative of meeting a threshold amount of error (e.g., at least 5% error in deposition drift following a deposition operation, at least 5% error in production, at least 5% error in flow, at least 5% error in deformation, specification limit).

In some embodiments, historical data includes one or more of historical property data 144 and/or historical performance data 154 (e.g., at least a portion for training the machine learning model 190). Current data includes one or more of current property data 146 and/or current performance data 156 (e.g., at least a portion to be input into the trained machine learning model 190 subsequent to training the model 190 using the historical data). In some embodiments, the current data is used for retraining the trained machine learning model 190.

In some embodiments, the predictive data 160 is to be used to cause performance of corrective actions on the process recipes, deposition operation parameters of recipes/operations, manufacturing equipment, substrate processing system, or substrate processing equipment parts.

Performing multiple types of metrology on multiple layers of products or processing chambers to determine whether to perform a corrective action is costly in terms of time used, metrology equipment 128 used, energy consumed, bandwidth used to send the metrology data, processor overhead to process the metrology data, etc. By providing property data 142 to model 190 and receiving predictive data 160 from the model 190, system 100 has the technical advantage of avoiding the costly process of using metrology equipment

128 on multiple layers of products and/or sensors on the processing chamber and to avoid wasting time and discarding substrates.

Performing manufacturing processes (e.g., depositions) with manufacturing equipment 124 and/or manufacturing parameters (e.g., deposition operation parameters) that result in defective products or damaged manufacturing equipment is costly in time, energy, products, manufacturing equipment 124, the cost of identifying the corrective action to avoid causing the defective products, etc. By providing property data 142 to model 190, receiving predictive data 160 from the model 190, and causing a corrective action (e.g., updating the recipe) based on the predictive data 160, system 100 has the technical advantage of avoiding the cost of producing, identifying, and discarding defective substrates.

In some embodiments, predictive system 110 further includes server machine 170 and server machine 180. Server machine 170 includes a data set generator 172 that is capable of generating data sets (e.g., a set of data inputs and a set of target outputs) to train, validate, and/or test a machine learning model(s) 190. The data set generator 172 has functions of data gathering, compilation, reduction, and/or partitioning to put the data in a form for machine learning. In some embodiments (e.g., for small datasets), partitioning (e.g., explicit partitioning) for post-training validation is not used. Repeated cross-validation (e.g., 5-fold cross-validation, leave-one-out-cross-validation) may be used during training where a given dataset is in-effect repeatedly partitioned into different training and validation sets during training. A model (e.g., the best model, the model with the highest accuracy, etc.) is chosen from vectors of models over automatically-separated combinatoric subsets. In some embodiments, the data set generator 172 may explicitly partition the historical data (e.g., historical property data 144 and corresponding historical performance data 154) into a training set (e.g., sixty percent of the historical data), a validating set (e.g., twenty percent of the historical data), and a testing set (e.g., twenty percent of the historical data). Some operations of data set generator 172 are described in detail below with respect to FIG. 2 according to some embodiments. In some embodiments, the predictive system 110 (e.g., via predictive component 114) generates multiple sets of features (e.g., training features). In some examples a first set of features corresponds to a first set of types of property data (e.g., from a first set of sensors, first combination of values from first set of sensors, first patterns in the values from the first set of sensors) that correspond to each of the data sets (e.g., training set, validation set, and testing set) and a second set of features correspond to a second set of types of property data (e.g., from a second set of sensors different from the first set of sensors, second combination of values different from the first combination, second patterns different from the first patterns) that correspond to each of the data sets.

Server machine 180 includes a training engine 182, a validation engine 184, selection engine 185, and/or a testing engine 186. In some embodiments, an engine (e.g., training engine 182, a validation engine 184, selection engine 185, and a testing engine 186) refers to hardware (e.g., circuitry, dedicated logic, programmable logic, microcode, processing device, etc.), software (such as instructions run on a processing device, a general-purpose computer system, or a dedicated machine), firmware, microcode, or a combination thereof. The training engine 182 is capable of training a machine learning model 190 using one or more sets of features associated with the training set from data set generator 172. In some embodiments, the training engine 182 generates multiple trained machine learning models 190, where each trained machine learning model 190 corresponds to a distinct set of parameters of the training set (e.g., property data 142) and corresponding responses (e.g., performance data 152). In some embodiments, multiple models are trained on the same parameters with distinct targets for the purpose of modeling multiple effects. In some examples, a first trained machine learning model was trained using property data 142 from all sensors 126 (e.g., sensors 1-5), a second trained machine learning model was trained using a first subset of the property data (e.g., from sensors 1, 2, and 4), and a third trained machine learning model was trained using a second subset of the property data (e.g., from sensors 1, 3, 4, and 5) that partially overlaps the first subset of features.

The validation engine 184 is capable of validating a trained machine learning model 190 using a corresponding set of features of the validation set from data set generator 172. For example, a first trained machine learning model 190 that was trained using a first set of features of the training set is validated using the first set of features of the validation set. The validation engine 184 determines an accuracy of each of the trained machine learning models 190 based on the corresponding sets of features of the validation set. The validation engine 184 evaluates and flags (e.g., to be discarded) trained machine learning models 190 that have an accuracy that does not meet a threshold accuracy. In some embodiments, the selection engine 185 is capable of selecting one or more trained machine learning models 190 that have an accuracy that meets a threshold accuracy. In some embodiments, the selection engine 185 is capable of selecting the trained machine learning model 190 that has the highest accuracy of the trained machine learning models 190.

The testing engine 186 is capable of testing a trained machine learning model 190 using a corresponding set of features of a testing set from data set generator 172. For example, a first trained machine learning model 190 that was trained using a first set of features of the training set is tested using the first set of features of the testing set. The testing engine 186 determines a trained machine learning model 190 that has the highest accuracy of all of the trained machine learning models based on the testing sets.

In some embodiments, the machine learning model 190 (e.g., used for classification) refers to the model artifact that is created by the training engine 182 using a training set that includes data inputs and corresponding target outputs (e.g., correctly classifies a condition or ordinal level for respective training inputs). Patterns in the data sets can be found that map the data input to the target output (the correct classification or level), and the machine learning model 190 is provided mappings that captures these patterns. In some embodiments, the machine learning model 190 uses one or more of Gaussian Process Regression (GPR), Gaussian Process Classification (GPC), Bayesian Neural Networks, Neural Network Gaussian Processes, Deep Belief Network, Gaussian Mixture Model, or other Probabilistic Learning methods. Non probabilistic methods may also be used including one or more of Support Vector Machine (SVM), Radial Basis Function (RBF), clustering, Nearest Neighbor algorithm (k-NN), linear regression, random forest, neural network (e.g., artificial neural network), etc. In some embodiments, the machine learning model 190 is a multivariate analysis (MVA) regression model.

Predictive component 114 provides current property data 146 (e.g., as input) to the trained machine learning model 190 and runs the trained machine learning model 190 (e.g., on the input to obtain one or more outputs). The predictive component 114 is capable of determining (e.g., extracting) predictive data 160 from the trained machine learning model 190 and determines (e.g., extracts) uncertainty data that indicates a level of credibility that the predictive data 160 corresponds to current performance data 156. In some embodiments, the predictive component 114 or corrective action component 122 use the uncertainty data (e.g., uncertainty function or acquisition function derived from uncertainty function) to decide whether to use the predictive data 160 to perform a corrective action or whether to further train the model 190.

For purpose of illustration, rather than limitation, aspects of the disclosure describe the training of one or more machine learning models 190 using historical data (i.e., prior data, historical property data 144 and historical performance data 154) and providing current property data 146 into the one or more trained probabilistic machine learning models 190 to determine predictive data 160. In other implementations, a heuristic model or rule-based model is used to determine predictive data 160 (e.g., without using a trained machine learning model). In other implementations non-probabilistic machine learning models may be used. Predictive component 114 monitors historical property data 144 and historical performance data 154. In some embodiments, any of the information described with respect to data inputs 210 of FIG. 2 are monitored or otherwise used in the heuristic or rule-based model.

In some embodiments, the functions of client device 120, predictive server 112, server machine 170, and server machine 180 are to be provided by a fewer number of machines. For example, in some embodiments, server machines 170 and 180 are integrated into a single machine, while in some other embodiments, server machine 170, server machine 180, and predictive server 112 are integrated into a single machine. In some embodiments, client device 120 and predictive server 112 are integrated into a single machine.

In general, functions described in one embodiment as being performed by client device 120, predictive server 112, server machine 170, and server machine 180 can also be performed on predictive server 112 in other embodiments, if appropriate. In addition, the functionality attributed to a particular component can be performed by different or multiple components operating together. For example, in some embodiments, the predictive server 112 determines corrective actions based on the predictive data 160. In another example, client device 120 determines the predictive data 160 based on data received from the trained machine learning model.

In addition, the functions of a particular component can be performed by different or multiple components operating together. In some embodiments, one or more of the predictive server 112, server machine 170, or server machine 180 are accessed as a service provided to other systems or devices through appropriate application programming interfaces (API).

In some embodiments, a "user" is represented as a single individual. However, other embodiments of the disclosure encompass a "user" being an entity controlled by a plurality of users and/or an automated source. In some examples, a set of individual users federated as a group of administrators is considered a "user."

Although embodiments of the disclosure are discussed in terms of determining predictive data 160 for residual thickness compensation (e.g., updating recipe based on thickness values) during substrate manufacturing in substrate processing in manufacturing facilities (e.g., substrate processing facilities), in some embodiments, the disclosure can also be generally applied to corrective actions in manufacturing facilities. Embodiments can be generally applied to determining quality of parts based on different types of data.

FIG. 2 illustrates a data set generator 272 (e.g., data set generator 172 of FIG. 1) to create data sets for a machine learning model (e.g., associated with residual thickness compensation, methods 400A-C, etc.) (e.g., model 190 of FIG. 1), according to certain embodiments. In some embodiments, data set generator 272 is part of server machine 170 of FIG. 1. The data sets generated by data set generator 272 of FIG. 2 may be used to train a machine learning model (e.g., see FIG. 4B) to cause performance of a corrective action (e.g., see FIG. 4C).

Data set generator 272 (e.g., data set generator 172 of FIG. 1) creates data sets for a machine learning model (e.g., model 190 of FIG. 1). Data set generator 272 creates data sets using historical property data 244 (e.g., historical property data 144 of FIG. 1) and historical performance data 254 (e.g., historical performance data 154 of FIG. 1). System 200 of FIG. 2 illustrates data set generator 272, data inputs 210, and target output 220 (e.g., target data).

In some embodiments, data set generator 272 generates a data set (e.g., training set, validating set, testing set) that includes one or more data inputs 210 (e.g., training input, validating input, testing input). In some embodiments, data set generator 272 does not generate target output (e.g., for unsupervised learning). In some embodiments, data set generator generates one or more target outputs 220 (e.g., for supervised learning) that correspond to the data inputs 210. The data set may also include mapping data that maps the data inputs 210 to the target outputs 220. Data inputs 210 are also referred to as "features," "attributes," or "information." In some embodiments, data set generator 272 provides the data set to the training engine 182, validation engine 184, or testing engine 186, where the data set is used to train, validate, or test the machine learning model 190 (e.g., associated with adjustment of film deposition parameters based on residual thickness during substrate manufacturing, methods 400A-C, etc.).

In some embodiments, data set generator 272 generates the data input 210 and target output 220. In some embodiments, data inputs 210 include one or more sets of historical property data 244 (e.g., total residual thickness values, material thickness values, etc.) (e.g., associated with adjustment of film deposition parameters based on residual thickness during substrate manufacturing, methods 400A-C, etc.). In some embodiments, historical property data 244 includes one or more of property data from one or more types of sensors and/or metrology equipment, combination of property data from one or more types of sensors and/or metrology equipment, patterns from property data from one or more types of sensors and/or metrology equipment, and/or the like.

In some embodiments, data set generator 272 generates a first data input corresponding to a first set of historical property data 244A to train, validate, or test a first machine learning model and the data set generator 272 generates a second data input corresponding to a second set of historical property data 244B to train, validate, or test a second machine learning model (e.g., associated with adjustment of film deposition parameters based on residual thickness during substrate manufacturing, methods 400A-C, etc.).

In some embodiments, the data set generator 272 discretizes (e.g., segments) one or more of the data input 210 or the target output 220 (e.g., to use in classification algorithms for regression problems). Discretization (e.g., segmentation via a sliding window) of the data input 210 or target output 220 transforms continuous values of variables into discrete values. In some embodiments, the discrete values for the data input 210 indicate discrete historical property data 144 to obtain a target output 220 (e.g., discrete historical performance data 154).

Data inputs 210 and target outputs 220 to train, validate, or test a machine learning model include information for a particular facility (e.g., for a particular substrate manufacturing facility). In some examples, historical property data 244 and historical performance data 254 are for the same manufacturing facility (e.g., associated with adjustment of film deposition parameters based on residual thickness during substrate manufacturing, methods 400A-C, etc.).

In some embodiments, the information used to train the machine learning model is from specific types of manufacturing equipment 124 of the manufacturing facility having specific characteristics and allow the trained machine learning model (e.g., associated with adjustment of film deposition parameters based on residual thickness during substrate manufacturing, methods 400A-C, etc.) to determine outcomes for a specific group of manufacturing equipment 124 based on input for current parameters (e.g., current property data 146) associated with one or more components sharing characteristics of the specific group. In some embodiments, the information used to train the machine learning model is for components from two or more manufacturing facilities and allows the trained machine learning model to determine outcomes for components based on input from one manufacturing facility.

In some embodiments, subsequent to generating a data set and training, validating, or testing a machine learning model 190 using the data set, the machine learning model 190 (e.g., associated with adjustment of film deposition parameters based on residual thickness during substrate manufacturing, methods 400A-C, etc.) is further trained, validated, or tested (e.g., current performance data 156 of FIG. 1) or adjusted (e.g., adjusting weights associated with input data of the machine learning model 190, such as connection weights in a neural network).

The machine learning model processes the input to generate an output (e.g., associated with adjustment of film deposition parameters based on residual thickness during substrate manufacturing, methods 400A-C, etc.). An artificial neural network includes an input layer that consists of values in a data point. The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer can be another hidden layer or an output layer. In either case, the nodes at the next layer receive the output values from the nodes at the previous layer, and each node applies weights to those values and then generates its own output value. This can be performed at each layer. A final layer is the output layer, where there is one node for each class, prediction and/or output that the machine learning model can produce.

Accordingly, the output can include one or more predictions or inferences (e.g., associated with adjustment of film deposition parameters based on residual thickness during substrate manufacturing, methods 400A-C, etc.). For example, an output prediction or inference can include one or more predictions of deposition drift, film buildup on chamber components, erosion of chamber components, predicted failure of chamber components, predicted failure of deposition operation, and so on. Processing logic determines an error (i.e., a classification error) based on the differences between the output (e.g., predictions or inferences) of the machine learning model and target labels associated with the input training data. Processing logic adjusts weights of one or more nodes in the machine learning model based on the error. An error term or delta can be determined for each node in the artificial neural network. Based on this error, the artificial neural network adjusts one or more of its parameters for one or more of its nodes (the weights for one or more inputs of a node). Parameters can be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters can include adjusting the weights assigned to each of the inputs for one or more neurons at one or more layers in the artificial neural network.

After one or more rounds of training, processing logic can determine whether a stopping criterion has been met. A stopping criterion can be a target level of accuracy, a target number of processed images from the training dataset, a target amount of change to parameters over one or more previous data points, a combination thereof and/or other criteria. In some embodiments, the stopping criteria is met when at least a minimum number of data points have been processed and at least a threshold accuracy is achieved. The threshold accuracy can be, for example, 70%, 80% or 90% accuracy. In some embodiments, the stopping criterion is met if accuracy of the machine learning model has stopped improving. If the stopping criterion has not been met, further training is performed. If the stopping criterion has been met, training can be complete. Once the machine learning model is trained, a reserved portion of the training dataset can be used to test the model.

FIG. 3 is a block diagram illustrating a system 300 for generating predictive data 360 (e.g., predictive data 160 of FIG. 1), according to certain embodiments. The system 300 is used to determine predictive data 360 via a trained machine learning model (e.g., associated with residual thickness compensation, methods 400A-C, etc.) (e.g., model 190 of FIG. 1).

At block 310, the system 300 (e.g., predictive system 110 of FIG. 1) performs data partitioning (e.g., via data set generator 172 of server machine 170 of FIG. 1) of the historical data (e.g., historical property data 344 and/or historical performance data 354 for model 190 of FIG. 1) to generate the training set 302, validation set 304, and testing set 306 (e.g., associated with adjustment of film deposition parameters based on residual thickness during substrate manufacturing, methods 400A-C, etc.). In some examples, the training set is 60% of the historical data, the validation set is 20% of the historical data, and the testing set is 20% of the historical data. The system 300 generates a plurality of sets of features for each of the training set, the validation set, and the testing set. In some examples, if the historical data includes features derived from 20 sensors (e.g., sensors 126 of FIG. 1, sensors of manufacturing equipment and/or metrology equipment) and 100 products (e.g., products that each correspond to property data from the 20 sensors), a first set of features is sensors 1-10, a second set of features is sensors 11-20, the training set is products 1-60, the validation set is products 61-80, and the testing set is products 81-100. In this example, the first set of features of the training set would be parameters from sensors 1-10 for products 1-60.

At block 312, the system 300 performs model training (e.g., via training engine 182 of FIG. 1 associated with adjustment of film deposition parameters based on residual thickness during substrate manufacturing, methods 400A-C, etc.) using the training set 302. In some embodiments, the system 300 trains multiple models using multiple sets of features of the training set 302 (e.g., a first set of features of the training set 302, a second set of features of the training set 302, etc.). For example, system 300 trains a machine learning model to generate a first trained machine learning model using the first set of features in the training set (e.g., property data from sensors 1-10 for products 1-60) and to generate a second trained machine learning model using the second set of features in the training set (e.g., property data from sensors 11-20 for products 1-60). In some embodiments, the first trained machine learning model and the second trained machine learning model are combined to generate a third trained machine learning model (e.g., which is a better predictor than the first or the second trained machine learning model on its own in some embodiments). In some embodiments, sets of features used in comparing models overlap (e.g., first set of features being property data from sensors 1-15 and second set of features being property data from sensors 5-20). In some embodiments, hundreds of models are generated including models with various permutations of features and combinations of models.

At block 314, the system 300 performs model validation (e.g., via validation engine 184 of FIG. 1) using the validation set 304. The system 300 validates each of the trained models (e.g., associated with adjustment of film deposition parameters based on residual thickness during substrate manufacturing, methods 400A-C, etc.) using a corresponding set of features of the validation set 304. For example, system 300 validates the first trained machine learning model using the first set of features in the validation set (e.g., parameters from sensors 1-10 for products 61-80) and the second trained machine learning model using the second set of features in the validation set (e.g., parameters from sensors 11-20 for products 61-80). In some embodiments, the system 300 validates hundreds of models (e.g., models with various permutations of features, combinations of models, etc.) generated at block 312. At block 314, the system 300 determines an accuracy of each of the one or more trained models (e.g., via model validation) and determines whether one or more of the trained models has an accuracy that meets a threshold accuracy. Responsive to determining that none of the trained models has an accuracy that meets a threshold accuracy, flow returns to block 312 where the system 300 performs model training using different sets of features of the training set. Responsive to determining that one or more of the trained models has an accuracy that meets a threshold accuracy, flow continues to block 316. The system 300 discards the trained machine learning models that have an accuracy that is below the threshold accuracy (e.g., based on the validation set).

At block 316, the system 300 performs model selection (e.g., via selection engine 185 of FIG. 1) to determine which of the one or more trained models that meet the threshold accuracy has the highest accuracy (e.g., the selected model 308, based on the validating of block 314). Responsive to determining that two or more of the trained models that meet the threshold accuracy have the same accuracy, flow returns to block 312 where the system 300 performs model training using further refined training sets corresponding to further refined sets of features for determining a trained model that has the highest accuracy.

At block 318, the system 300 performs model testing (e.g., via testing engine 186 of FIG. 1) using the testing set 306 to test the selected model 308. The system 300 tests, using the first set of features in the testing set (e.g., property data from sensors 1-10 for products 81-100), the first trained machine learning model to determine the first trained machine learning model meets a threshold accuracy (e.g., based on the first set of features of the testing set 306). Responsive to accuracy of the selected model 308 not meeting the threshold accuracy (e.g., the selected model 308 is overly fit to the training set 302 and/or validation set 304 and is not applicable to other data sets such as the testing set 306), flow continues to block 312 where the system 300 performs model training (e.g., retraining) using different training sets corresponding to different sets of features (e.g., property data from different sensors). Responsive to determining that the selected model 308 has an accuracy that meets a threshold accuracy based on the testing set 306, flow continues to block 320. In at least block 312, the model learns patterns in the historical data to make predictions and in block 318, the system 300 applies the model on the remaining data (e.g., testing set 306) to test the predictions (e.g., associated with adjustment of film deposition parameters based on residual thickness during substrate manufacturing, methods 400A-C, etc.).

At block 320, system 300 uses the trained model (e.g., selected model 308) to receive current property data 346 (e.g., current property data 146 of FIG. 1) and determines (e.g., extracts), from the trained model, predictive data 360 (e.g., predictive data 160 of FIG. 1) for adjustment of film deposition parameters based on residual thickness during substrate manufacturing to perform a corrective action (e.g., updating the process recipe, causing modification of deposition operation parameters, causing a substrate to be processed based on an updated recipe, etc.). In some embodiments, the current property data 346 corresponds to the same types of features in the historical property data 344. In some embodiments, the current property data 346 corresponds to a same type of features as a subset of the types of features in historical property data 344 that is used to train the selected model 308 (e.g., associated with adjustment of film deposition parameters based on residual thickness during substrate manufacturing, methods 400A-C, etc.).

In some embodiments, current data is received. In some embodiments, current data includes current performance data 356 (e.g., current performance data 156 of FIG. 1) and/or current property data 346 (e.g., associated with adjustment of film deposition parameters based on residual thickness during substrate manufacturing, methods 400A-C, etc.). In some embodiments, at least a portion of the current data is received from metrology equipment (e.g., metrology equipment 128 of FIG. 1) or via user input. In some embodiments, the model is re-trained based on the current data. In some embodiments, a new model is trained based on the current performance data 356 and the current property data 346.

In some embodiments, one or more of the blocks 310-320 occur in various orders and/or with other operations not presented and described herein. In some embodiments, one or more of blocks 310-320 are not to be performed. For example, in some embodiments, one or more of data partitioning of block 310, model validation of block 314, model selection of block 316, and/or model testing of block 318 are not to be performed.

Figure 4A:
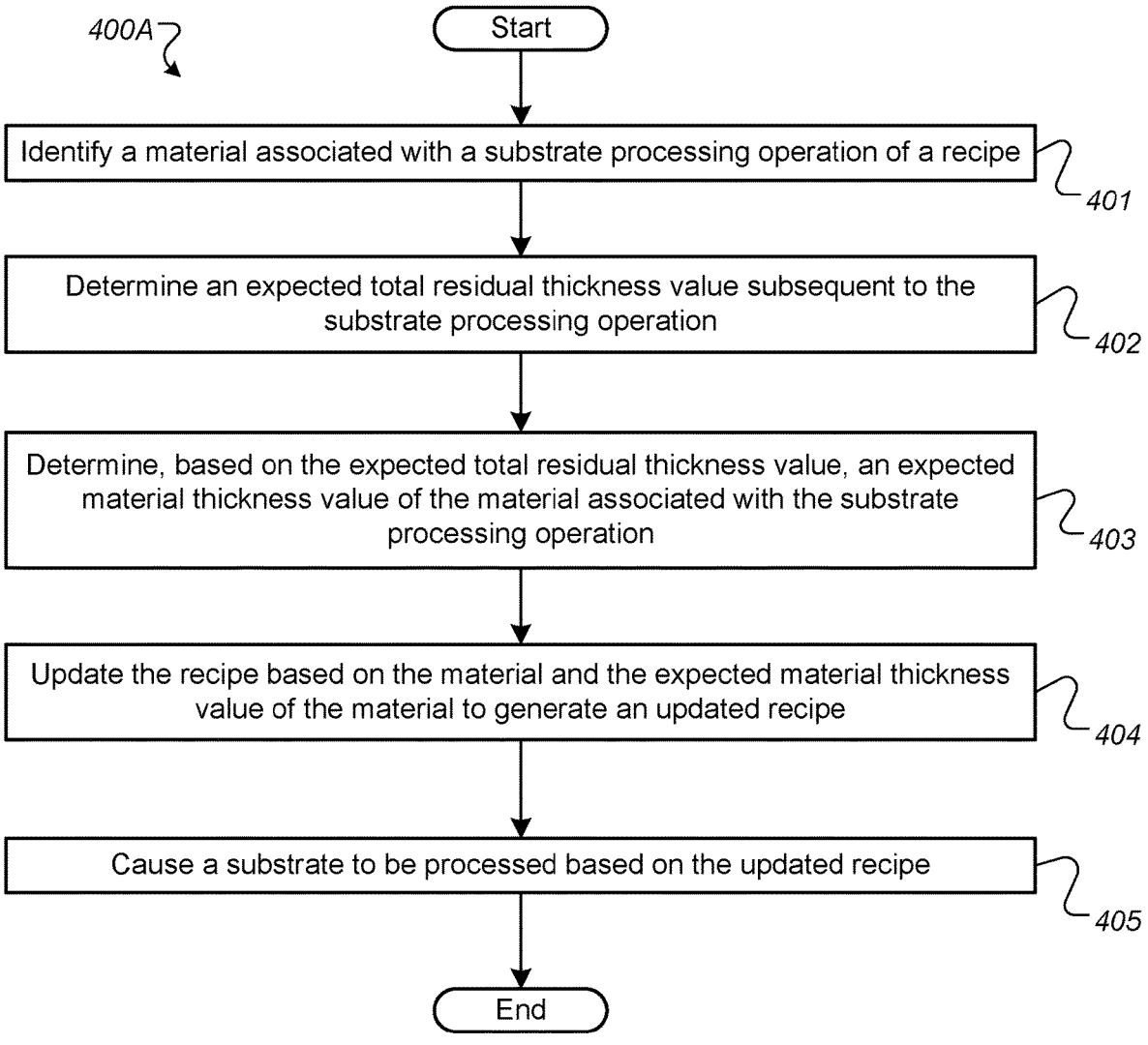
FIGS. 4A-C are flow diagrams of methods associated with residual thickness compensation, according to certain embodiments.
Figure 4B:
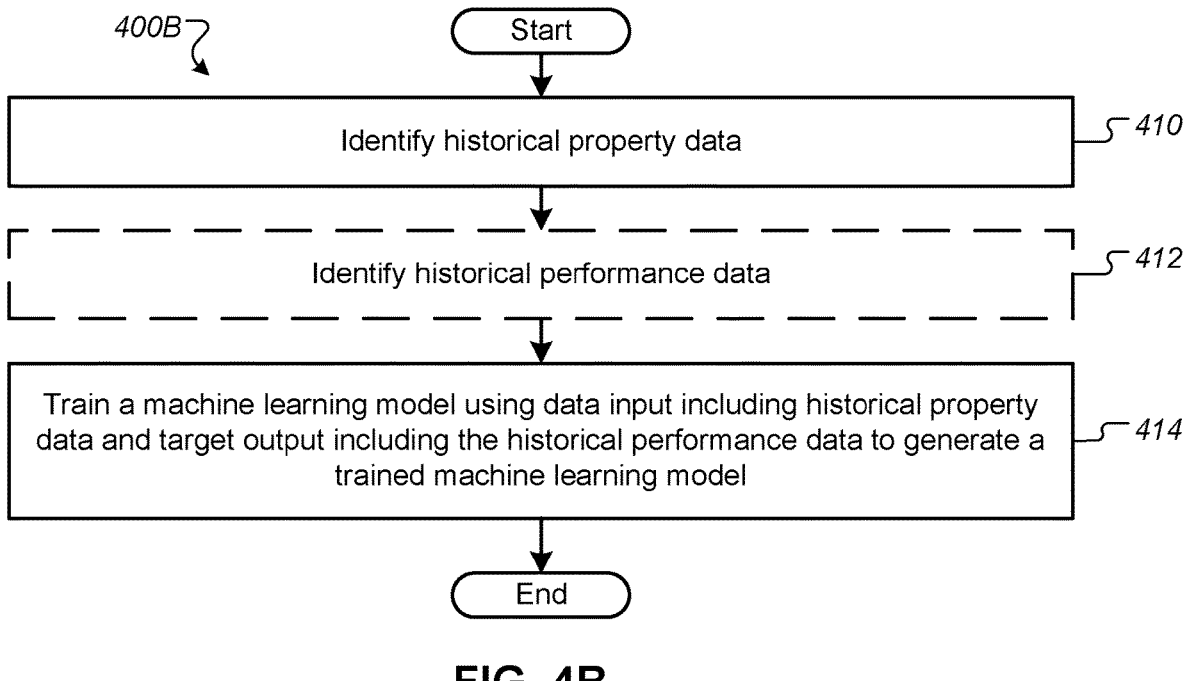
Figure 4C:
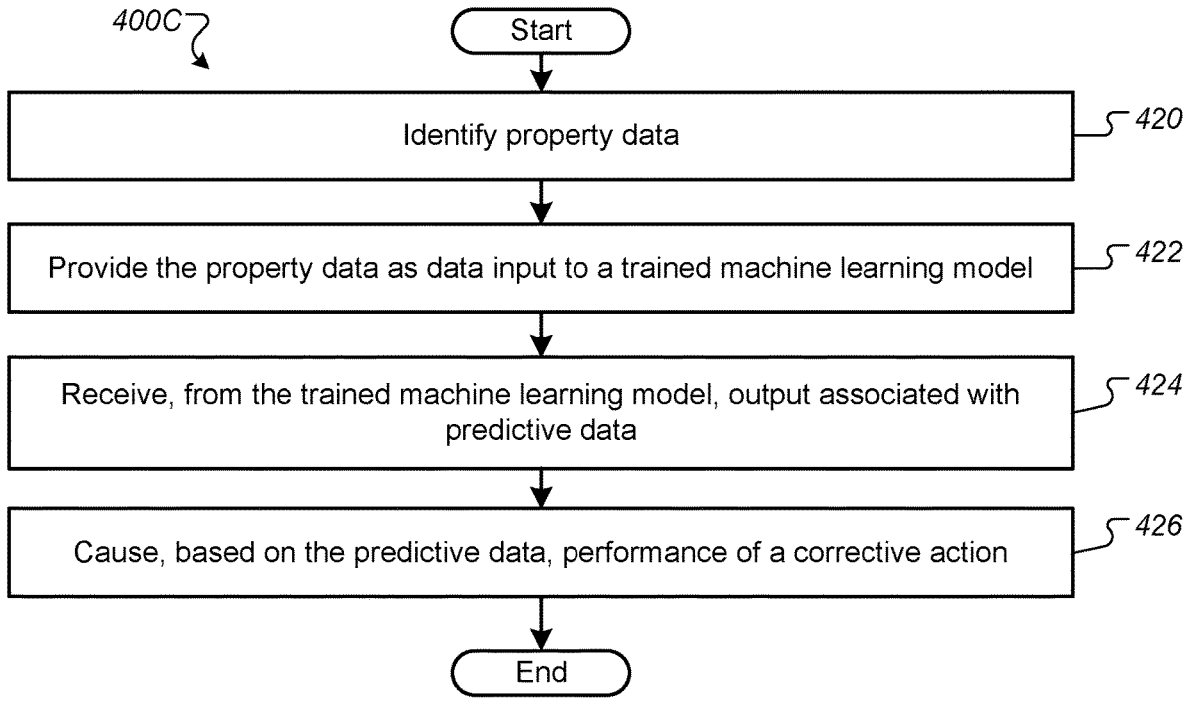

FIGS. 4A-C are flow diagrams of methods 400A-C associated with associated with residual thickness compensation (e.g., residual-based adjustment of film deposition parameters during substrate manufacturing), according to certain embodiments. In some embodiments, methods 400A-C are performed by processing logic that includes hardware (e.g., circuitry, dedicated logic, programmable logic, microcode, processing device, etc.), software (such as instructions run on a processing device, a general-purpose computer system, or a dedicated machine), firmware, microcode, or a combination thereof. In one implementation, method 400A can be performed by a computer system, such as computer system architecture 100 of FIG. 1. In other or similar implementations, one or more operations of method 400A can be performed by one or more other machines not depicted in the figures. In some embodiments, methods 400A-C are performed, at least in part, by predictive system 110. In some embodiments, method 400A is performed by client device 120 (e.g., corrective action component 122) and/or predictive system 110 (e.g., predictive component). In some embodiments, method 400B is performed by server machine 180 (e.g., training engine 182, etc.). In some embodiments, method 400C is performed by predictive server 112 (e.g., predictive component 114) and/or client device 120 (e.g., corrective action component 122). In some embodiments, a non-transitory storage medium stores instructions that when executed by a processing device (e.g., of predictive system 110, of server machine 180, of predictive server 112, of client device 120, etc.), cause the processing device to perform one or more of methods 400A-C.

For simplicity of explanation, methods 400A-C are depicted and described as a series of operations. However, operations in accordance with this disclosure can occur in various orders and/or concurrently and with other operations not presented and described herein. Furthermore, in some embodiments, not all illustrated operations are performed to implement methods 400A-C in accordance with the disclosed subject matter. In addition, those skilled in the art will understand and appreciate that methods 400A-C could alternatively be represented as a series of interrelated states via a state diagram or events.

FIG. 4A is a flow diagram of a method associated with adjustment of film deposition parameters based on deposition thickness during substrate manufacturing, according to aspects of the present disclosure.

Referring to FIG. 4A, in some embodiments, at block 401 the processing logic implementing the method 400A identifies a material associated with a substrate processing operation of a recipe. In some embodiments, the identified materials can be reused across loops, and loops can have any number of materials in any order. In some embodiments, deposition drift compensation is based on the material identified and the substrate processing operation associated with the material. In some embodiments, the processing logic can receive user input identifying the material associated with a substrate processing operation of a recipe. In other embodiments, the process logic can automatically select a material associated with a substrate processing operation of a recipe. For example, the processing logic can identify a material associated with a substrate processing operation of a recipe for which at least one process run concluded and for which a material thickness value has been determined. In yet another embodiment, the processing logic can identify the material associated with a substrate processing operation of a recipe based on a currently executing process recipe. For example, the processing logic can perform a deposition process on a substrate according to a process recipe. The deposition process can be performed in one or more processing chambers. The process recipe can include one or more deposition parameters for the deposition process. For example, the deposition parameters can include deposition time for each layer and/or loop of the process recipe, a temperature setting for the processing chamber, a pressure setting for the processing chamber, a flow rate setting for a precursor for a material included in the film deposited on the substrate surface, a showerhead height, etc. In some embodiments, the deposition parameters may vary from one substrate processing area to another. The deposition process can deposit multiple layers on the substrate. For example, the deposition process can deposit alternating layers of oxide and nitride layers, alternating oxide and polysilicon layers, etc.

At block 402, the processing logic determines an expected total residual thickness value subsequent to the substrate processing operation. For example, the expected total residual thickness value can include the measured thickness of the residual film, the measured thickness of one or more layers of the residual film, and/or the measured thickness of one or more loops of the residual film, etc. The expected total residual thickness value can be measured using metrology equipment 128. In some embodiments, the thickness profile is retrieved from data store 140. In some embodiment, the expected total residual thickness can be derived from the process recipe. For example, a process recipe may be designed to deposit 200 angstroms of film. In such a case, the expected total residual thickness value may be 200 angstroms. In some embodiments, the expected total residual thickness value can be measured using sensors 126 to measure the deposition on the processing chamber wall. In some embodiments, the expected total residual thickness can be determined based on parameters of at least one deposition operation (e.g., time of deposition, rate of deposition, etc.).

In some embodiments, the processing logic may determine the property data (e.g., expected total residual thickness values) by way of a sensor that collects the property data (e.g., by measuring the deposition residual thickness on the processing chamber walls). In some embodiments, the processing logic may identify the property data based on an expected thickness added to the substrate (e.g., a thickness parameter of a deposition operation, a measured thickness from a previous run of the same deposition operation, etc.). In some embodiments, the processing logic may identify the property data based on the material deposited and the amount of time it is deposited (e.g., a process recipe, deposition operation parameters, etc.). In some embodiments, the processing logic may identify the property data based on sensor data and/or metrology data (e.g., total residual thickness values, material thickness values, RF power of the substrate processing operation, a spacing value of the substrate processing operation, a gas flow value of the substrate processing operation, or a chamber pressure value of the substrate processing operation, etc.) of a substrate that underwent a substrate processing operation (e.g., deposition operation).

At block 403, the processing logic determines, based on the expected total residual thickness value, an expected material thickness value of the material associated with the substrate processing operation.

In some embodiments, the processing logic can determine an expected material thickness value associated with the substrate processing operation using one or more formulas or mathematical models. In some embodiments, there may be a relationship (e.g., based on the identified material associated with the substrate processing operation of the recipe) between the expected total residual thickness and the expected material thickness. In some embodiments, the relationship may be a mathematical relationship, equation, function, and/or the like. In some embodiments, the relationship may be derived using at least an expected material thickness (e.g., data points representing the material thickness following a deposition operation), an expected total residual thickness (e.g., data points representing wall residue thickness, dirtiness, etc.), and a deposition time (data points representing the duration of deposition operations in the process recipe). In some embodiments, the input of the equation or function is the expected total residual thickness, and the output of the equation is the expected material thickness. In some embodiments, the processing logic may scale the deposition operation time appropriately to compensate for drift.

In some embodiments, a first relationship associated with a material may correspond to a first substrate processing area (e.g., slot) and a second relationship associated with the same material may corresponding to a second substrate processing area (e.g., relationships based on the same material may be specific to a certain slot).

In some embodiments, the processing logic may generate an equation (e.g., polynomial, linear, logarithmic, etc.) associated with the identified material. In some embodiments, the equation can be reused across loops. In some embodiments, there may be a material-based equation specific to each substrate processing area (e.g., slot). For example, a polynomial equation with an order of three may be used and can be expressed as: $y=ax^3+bx^2+cx+d$, where (x, y) are coordinates and a, b, c, and d are constants. The polynomial equation having an order of three is used by way of example, and a polynomial equation (of any order), linear, logarithmic, exponential, etc. may be used. In some embodiments, the equation may be generated using a set of expected total residual thickness values (e.g., expected chamber wall residual thickness values) as x variables (e.g., the chamber wall residual thickness after loop one, the chamber wall residual thickness after loop two, the chamber wall residual thickness after loop three, and so forth), and expected material thickness values as y coordinates (e.g., expected deposition thickness at different chamber wall residual thicknesses). The (x, y) values can be retrieved from the expected profile. Using a set of (x, y) coordinates, the constants are determined for the equation. In some embodiments, total residual thickness (e.g., chamber wall residue thickness) is the season thickness plus the deposition thickness, where deposition thickness equals to the total thickness of all previous loops. A seasoning thickness can include a layer (e.g., silicon oxide layer) over the chamber walls before a substrate is introduced into the chamber for processing. The deposited seasoning layer reducing the likelihood that contaminates will interfere with subsequent processing steps.

In some embodiments, the processing logic may determine a (y) value for a particular loop using the equation and the total residual thickness. In particular, the processing logic may receive an input (e.g., user based input, automatic input, etc.) indicating a layer or loop of the deposition process. The processing logic can then input the actual material thickness for the loop or layer (obtained from the thickness profile) into the equation to calculate the (y) for the loop or layer.

In some embodiments, the expected material thickness value can include the desired thickness of the film, the desired thickness of one or more layers of the film, and/or the desired thickness of one or more loops of the film, etc. In some embodiments, the expected material thickness value is retrieved from data store 140. In some embodiments, the expected material thickness value may be a difference between a desired material thickness value and an actual material thickness value. In some embodiments, the determining of the expected material thickness value may include providing the expected total residual thickness value as input to a trained machine learning model. In some embodiments, the determining of the expected material thickness value may include receiving, from the trained machine learning model, output associated with predictive data, where the expected material thickness value is associated with the predicted data. In some embodiments, the trained machine learning model may be trained with a data input comprising historical total residual thickness values and target output of historical material thickness values.

At block 404, the processing logic updates the recipe based on the material and the expected material thickness value of the material to generate an updated recipe (e.g., with updated deposition operation parameters, such as time values (of deposition), updated time values, RF power of the substrate processing operation, a spacing value of the substrate processing operation, an gas flow value of the substrate processing operation, a chamber pressure value of the substrate processing operation, temperature of chamber, etc.). In some embodiments, the updating of the recipe may include determining an updated time value associated with the substrate processing operation. In some embodiments, the determining of the updated time value associated with the substrate processing operation may be based on a time value associated with the substrate processing operation, the expected total residual thickness value, and the expected material thickness value. In some embodiments, the updating of the recipe may include determining at least one of an updated RF power of the substrate processing operation, an updated spacing value of the substrate processing operation, an updated gas flow value of the substrate processing operation, or an updated chamber pressure value of the substrate processing operation.

In some embodiments, the updated recipe can include one or more corrective actions (e.g., update deposition operation parameters, update process recipe, etc.) to be applied to the parameters of the process recipe (e.g., associated with the processing chamber during one or more operations of the process recipe). In particular, the updated recipe can include adjustments to the deposition time of each of one or more layers and/or one or more loops, to a temperature setting for the processing chamber, a pressure setting for the processing chamber, to a flow rate setting for a precursor for a material included in the film deposited on the substrate surface, to the power supplied to the processing chamber, to the ratio of two or more settings, etc. For example, the updated recipe can include deposition time adjustments for a loop of the process recipe. In some embodiments, the updated recipe can include a set of parameter adjustments for each layer and/or loop of the process recipe. For example, the updated recipe can include a deposition time adjustment for the first loop, for the second loop, for the third loop, and so forth, until the final loop. Each adjustment can be applied to a respective deposition step to adjust the thickness of one or more loops or layers such that the film stack thickness is the same as the expected film thickness indicated by the expected total residual thickness. For example, the expected total residual thickness can include the measured thickness of the film, the measured thickness of one or more layers of the film, and/or the measured thickness of one or more loops of the film, etc.

The thickness profile can be measured using metrology equipment 128 and/or one or more sensors 126. In some embodiments, the thickness profile is retrieved from data store 140.

For example, if the expected film thickness (e.g., expected total residual thickness) after loop 39 is of a first value (e.g., 30,000 nm), the expected film thickness after loop 40 is of a second value (e.g., 30,500 nm), and the actual film thickness (e.g., actual material thickness) during a deposition run and after loop 39 is of a third value (e.g., 30,050), the updated recipe can indicate the correction to the deposition time for loop 40 (e.g., decrease the deposition time for loop 40 by a certain time period) such that the actual film thickness after loop 40 is equal to the expected film thickness (e.g., 30,500 nm).

In some embodiments, the processing logic can generate the updated recipe using one or more formulas or mathematical models associated with the material associated with the substrate processing operation of the recipe. For example, the processing logic can use the data values from the expected total residual thickness and/or expected material thickness to generate a curve fitting model, then use the curve fitting model to determine an offset time value for a particular step during a current deposition process.

In some embodiments, for example, the mathematical equation (e.g., a polynomial equation with an order of three and expressed as: $y = ax^3 + bx^2 + cx + d$, where $(x, y)$ are coordinates and a, b, c, and d are constants) may be used to update the recipe (e.g., recipe for a substrate processing area). For example, in some embodiments, the processing logic may determine a (y) value for a particular loop using the equation and the total residual thickness. In particular, the processing logic may receive an input (e.g., user based input, automatic input, etc.) indicating a layer or loop of the deposition process. The processing logic can then input the actual material thickness for the loop or layer (obtained from the thickness profile) into the equation to calculate the (y) for the loop or layer. In some embodiments, the processing logic generates an updated recipe based on the calculated (y) value. In some embodiments, the updated recipe can be generated based on the following an equation. For example, updated recipe=(y[first loop]/y[current loop number])*$t_{step}$, where $t_{step}$ is the expected time of the selected loop. Although determining a correction profile (e.g., updated recipe) using a curve fitting method is discussed, other methods, formulas, and models can be used to generate a correction profile, including but not limited to, regression analysis, least squares method, etc.

In some embodiments, the processing logic can generate the updated recipe using a machine-learning model (e.g., machine learning model 190) or using an inference engine.

At block 405, the processing logic causes a substrate to be processed based on the updated recipe. For example, the processing logic can deposit a first set of film layers (e.g., perform a first set of loops of substrate processing operations) on the substrate, determine the expected total residual thickness value of the deposited film, generate an updated recipe to correct any faults detected during the deposition of the first set of film layers, apply the updated recipe to the process recipe, and deposit a second set of film layers (e.g., perform a second set of loops of substrate processing operations) on the substrate. Accordingly, the deposition process recipe can be adjusted in real or near real-time (e.g., substantially real-time). This process can be repeated for each deposition step of the process recipe.

In some embodiments, the updated recipe of block 405 may still cause drift in the processing chamber and in deposition of layers on the substrate. In some embodiments, performance data associated with the updated recipe may be identified following block 405. In some embodiments, certain parts of method 400A may be updated (e.g., update expected total residual thickness associated with the substrate processing operation of the recipe, update the expected material thickness value, update the deposition operation parameters, etc.), based on the performance data. In some embodiments, updated method 400A may be repeated to carry out the substrate processing operation of the recipe more accurately. In some embodiments, the processing logic may determine if the drift (e.g., material thickness value) meets a first threshold value (e.g., is more than a certain value) and may repeat method 400A until the drift meets a second threshold value (e.g., is less than the certain value). FIG. 4B is a flow diagram of a method for training a machine learning model (e.g., model 190 of FIG. 1) for determining predictive data (e.g., predictive data 160 of FIG. 1) associated with residual thickness compensation, according to aspects of the present disclosure.

Referring to FIG. 4B, at block 410 of method 400B, the processing logic identifies historical property data of substrates (e.g., historical total residual thickness values, a historical material associated with a historical substrate processing operation of a historical recipe, historical material thickness values, historical property data 144, etc.). Historical property data may include data from historical recipes, historical deposition operation parameters, historical substrates, historical processing chamber property data, and/or the like.

In some embodiments, at block 412, the processing logic identifies historical performance data (e.g., of substrates that meet threshold values, substrates that do not meet threshold values, recipes that meet threshold values, recipes that do not meet threshold values etc.) (e.g., historical material thickness values, difference between actual and expected material thickness value, difference between actual and expected total residual thickness value, historical performance data 154 of FIG. 1, etc.) of the historical deposition operation parameters, process recipes, substrates, processing chambers, and/or the like. Historical performance data may include historical material thickness values (e.g., difference between actual and expected material thickness value, difference between actual and expected total residual thickness value, etc.) and/or data from historical processing chambers such as values of one or more of accuracy of deposition operation, meeting an expected total residual thickness value, and/or the like (e.g., subsequent to a deposition operation). Performance data, including historical performance data, may include sensor data and/or metrology data (e.g., total residual thickness values, material thickness values, RF power vales, a spacing value, a gas flow value, or a chamber pressure value, etc.) or user input that indicates the performance of a substrate in meeting certain parameters or achieving certain levels of performance (e.g., ability to pass probe tests measuring voltage). Performance data, including historical performance data, may include sensor data and/or metrology data or user input that indicates the performance of a processing chamber in meeting certain parameters or achieving certain levels of performance (e.g., ability to pass deposition drift tests). At least a portion of the historical property data and the historical performance data may be associated with new substrate processing equipment parts (e.g., used for benchmarking). At least a portion of the historical property data and the historical performance data may be associated with manufactured substrates. At least a portion of the historical property data and the historical performance data may be associated with processing chambers.

At block 414, the processing logic trains a machine learning model using data input including historical property data 144 and/or target output including the historical performance data 154 to generate a trained machine learning model.

In some embodiments, the historical property data is of historical substrates or processing chambers and/or the historical performance data corresponds to the historical substrates or processing chambers. In some embodiments, the historical property data corresponds to deposition operations or process recipes or corresponds to substrates or processing chamber that underwent deposition operations or process recipes. In some embodiments, the historical property data includes historical metrology of historical substrates or processing chambers and/or the historical performance data corresponds to the historical substrates or processing chambers. The historical performance data may be associated with substrate quality, such as metrology data of substrates, substrate throughput, substrate defects, etc. The historical performance data may be associated with quality of process recipes (e.g., deposition operations), such as conformity of an actual total residual thickness value(s) to an expected total residual thickness value(s). The historical performance data may be associated with quality of a process recipe or deposition operation parameter, such as the ability to accurately deposit each layer and/or film, in conformity with the expected total residual thickness of a deposition operation. The historical performance data may be associated with quality of a substrate processing equipment part, such as test data, metrology data of the substrates, time of failure of substrates, etc.

At block 414, the processing logic trains a machine learning model using data input including historical property data 144 (e.g., historical total residual thickness values) and/or target output including the historical performance data 154 (e.g., historical material thickness values) to generate a trained machine learning model.

In some embodiments, the historical property data is of historical substrates or processing chambers and/or the historical performance data corresponds to the historical substrates or processing chambers. In some embodiments, the historical property data includes historical metrology of historical substrates or processing chambers and/or the historical performance data corresponds to the historical substrates or processing chambers. The historical performance data may be associated with substrate quality, such as metrology data of substrates (e.g., total residual thickness values, material thickness values, etc.), substrate throughput, substrate defects, etc. The historical performance data may be associated with quality of a process recipe or deposition operation, such as the ability to accurately deposit an expected total residual thickness and/or an expected material thickness. The historical performance data may be associated with quality of a substrate processing equipment part, such as test data, metrology data of the substrates, time of failure of substrates, etc.

At block 414, the machine learning model may be trained using historical property data 144 and/or target output including historical performance data 154 to generate a trained machine learning model configured to update the recipe, generate an updated recipe, and/or cause a corrective action (e.g., cause a substrate to be processed based on the updated recipe) based on property data. In some embodiments, the trained machine learning model may be configured to predict performance data 152 (e.g., performance data the updated process recipe, updated deposition operation parameters, performance data of substrates processed with the updated process recipe, performance data of substrates processed with the updated deposition operation parameters, etc.) based on property data 142 (e.g., expected total residual thickness values of block 402 of FIG. 4A, expected material thickness values of block 403 of FIG. 4A). Responsive to the predicted performance data meeting a threshold (e.g., deposition drift exceeds a certain value), the processing logic may cause a corrective action (e.g., updating deposition operation parameters, updating process recipe, causing a substrate to be processed based on the updated recipe, etc.). Responsive to the predicted performance data not meeting the threshold value, the process logic may cause a corrective action to not take place (e.g., cause process recipe to remain the same, cause deposition operation parameters to remain the same, etc.).

In some embodiments, deposition operation parameter may include time values, updated time values, recipes, updated recipes, RF power of the substrate processing operation, a spacing value of the substrate processing operation, an gas flow value of the substrate processing operation, a chamber pressure value of the substrate processing operation, updated RF power of the substrate processing operation, an updated spacing value of the substrate processing operation, an updated gas flow value of the substrate processing operation, an updated chamber pressure value of the substrate processing operation, etc.

FIG. 4C is a method 400C for using a trained machine learning model (e.g., model 190 of FIG. 1) associated with adjustment of film deposition parameters based on residual thickness during substrate manufacturing and causing performance of a corrective action.

Referring to FIG. 4C, at block 420 of method 400C, the processing logic identifies property data. In some embodiments, the property data of block 420 includes expected total residual thickness values, expected material thickness values, etc. In some embodiments, block 420 is similar to blocks 401 and 402 of FIG. 4A.

At block 422, the processing logic provides the property data as data input to a trained machine learning model (e.g., trained via block 414 of FIG. 4B). In some embodiments, the trained machine learning model may be associated with the variable relationship between the expected total residual thickness and the expected material thickness.

At block 424, the processing logic receives, from the trained machine learning model, output associated with predictive data, where the updated recipe is based on the predictive data.

At block 426, the processing logic causes, based on the predictive data, performance of a corrective action.

In some embodiments, block 403 of FIG. 4A includes training a machine learning model to determine, based on the expected total residual thickness value, an expected material thickness value of the material associated with the substrate processing operation. In some embodiments, block 403 of FIG. 4A includes using the trained machine learning model to determine, based on the expected total residual thickness value, an expected material thickness value of the material associated with the substrate processing operation.

In some embodiments, block 404 of FIG. 4A includes training a machine learning model to update the recipe based on the material and the expected material thickness value of the material to generate an updated recipe. In some embodiments, block 404 of FIG. 4A includes using a machine learning model to update the recipe based on the material and the expected material thickness value of the material to generate an updated recipe.

In some embodiments, the property data 142 is expected total residual thickness values (e.g., an expected deposition thickness associated with a deposition process) and the trained machine learning model of block 422 was trained using data input including historical expected total residual thickness values and/or historical actual total residual thickness values and target output including historical performance data 154 (e.g., actual total residual thickness values, actual material thickness values, etc.)

In some embodiments, the property data 142 is deposition thickness property data (e.g., expected total residual thickness values, expected material thickness values, etc.) and the trained machine learning model of block 422 was trained using data input including historical deposition thickness property data and target output including historical performance data 154 that includes historical deposition thickness property data of the historical substrates or historical deposition operations. The predictive data 160 of block 424 may be associated with predicted performance data (e.g., performance data of the substrate or performance data of a deposition recipe or operation) based on property data. Responsive to the predicted performance data meeting threshold (e.g., deposition drift exceeds a certain level), the processing logic may cause a corrective action (e.g., update process recipe, update deposition parameters, etc.). Responsive to a substrate not meeting the threshold value, the process logic may cause a corrective action to not take place (e.g., cause process recipe to remain the same, cause deposition parameters to remain the same, etc.).

Figure 5:
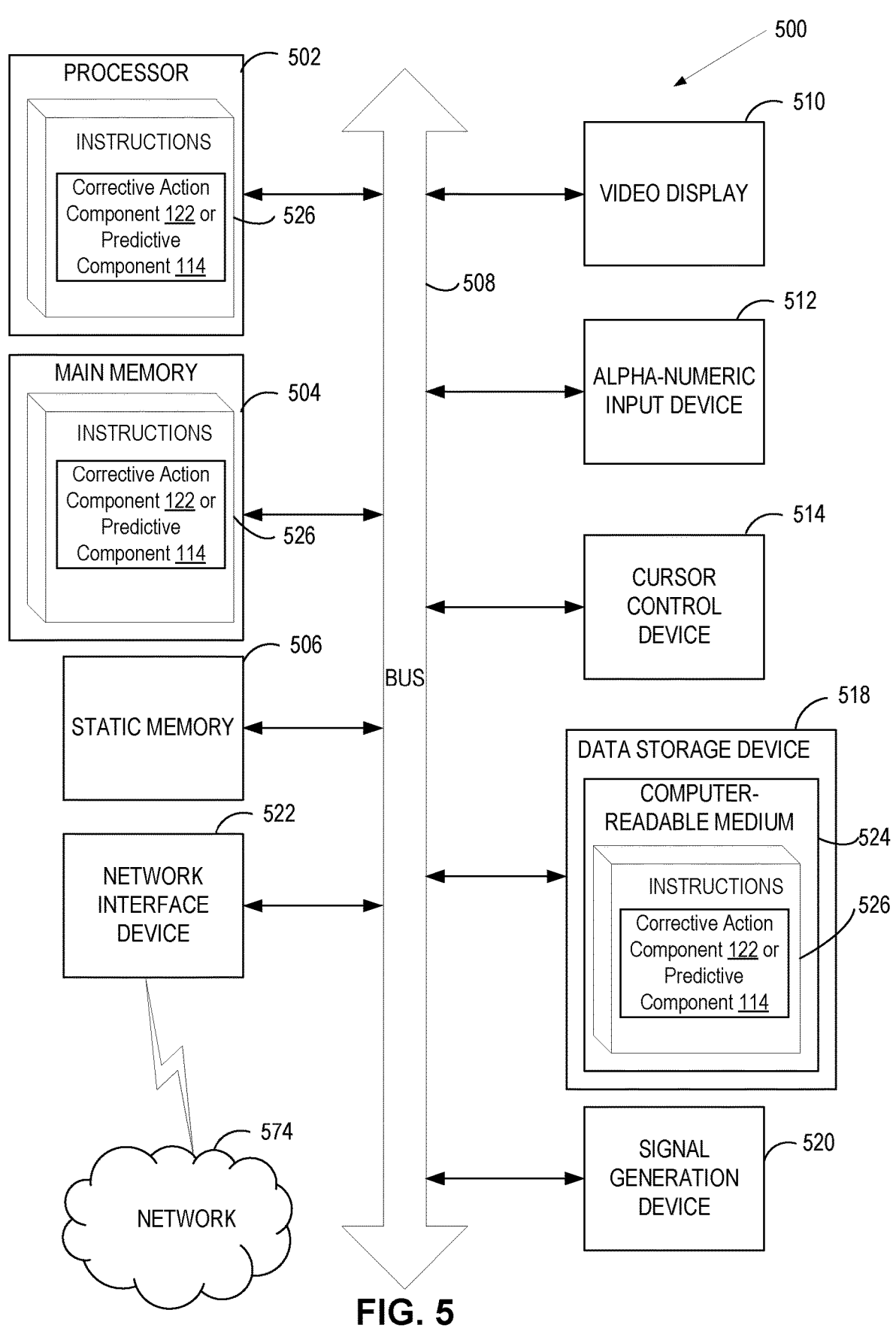
FIG. 5 is a block diagram illustrating a computer system, according to certain embodiments.

FIG. 5 is a block diagram illustrating a computer system 500, according to certain embodiments. In some embodiments, the computer system 500 is one or more of client device 120, predictive system 110, server machine 170, server machine 180, predictive server 112, and/or the like.

In some embodiments, computer system 500 is connected (e.g., via a network, such as a Local Area Network (LAN), an intranet, an extranet, or the Internet) to other computer systems. In some embodiments, computer system 500 operates in the capacity of a server or a client computer in a client-server environment, or as a peer computer in a peer-to-peer or distributed network environment. In some embodiments, computer system 500 is provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 includes a processing device 502, a volatile memory 504 (e.g., Random Access Memory (RAM)), a non-volatile memory 506 (e.g., Read-Only Memory (ROM) or Electrically-Erasable Programmable ROM (EEPROM)), and a data storage device 518, which communicate with each other via a bus 508.

In some embodiments, processing device 502 is provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

In some embodiments, computer system 500 further includes a network interface device 522 (e.g., coupled to network 574). In some embodiments, computer system 500 also includes a video display unit 510 (e.g., an liquid-crystal display (LCD)), an alphanumeric input device 512 (e.g., a keyboard), a cursor control device 514 (e.g., a mouse), and a signal generation device 520.

In some implementations, data storage device 518 includes a non-transitory computer-readable storage medium 524 on which store instructions 526 encoding any one or more of the methods or functions described herein, including instructions encoding components of FIG. 1 (e.g., corrective action component 122, predictive component 114, etc.) and for implementing methods described herein (e.g., one or more of methods 400A-C).

In some embodiments, instructions 526 also reside, completely or partially, within volatile memory 504 and/or within processing device 502 during execution thereof by computer system 500, hence, in some embodiments, volatile memory 504 and processing device 502 also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein can be implemented by discrete hardware components or can be integrated in the functionality of other hardware components such as application-specific integrated circuits (ASICS), FPGAS, DSPs or similar devices. In addition, the methods, components, and features can be implemented by firmware modules or functional circuitry within hardware devices. Further, the methods, components, and features can be implemented in any combination of hardware devices and computer program components, or in computer programs.

Unless specifically stated otherwise, terms such as "identifying," "determining," "updating," "causing," "providing," "receiving," "performing," "obtaining," "accessing," "adding," "using," "training," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and cannot have an ordinal meaning according to their numerical designation.

Examples described herein also relate to an apparatus for performing the methods described herein. This apparatus can be specially constructed for performing the methods described herein, or it can include a general purpose computer system selectively programmed by a computer program stored in the computer system. Such a computer program can be stored in a computer-readable tangible storage medium.

The methods and illustrative examples described herein are not inherently related to any particular computer or other apparatus. Various general purpose systems can be used in accordance with the teachings described herein, or it can prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
identifying a material associated with a substrate processing operation of a recipe;
determining an expected total residual thickness value subsequent to the substrate processing operation;
determining, based on the expected total residual thickness value, an expected material thickness value of the material associated with the substrate processing operation;
updating, based on the material and the expected material thickness value of the material, deposition operation parameters to generate an updated recipe to compensate for deposition drift; and
causing a substrate to be processed based on the updated recipe.

2. The method of claim 1, wherein the expected material thickness value is a difference between a desired material thickness value and an actual material thickness value.

3. The method of claim 1, wherein the updating of the recipe comprises determining an updated time value associated with the substrate processing operation.

4. The method of claim 3, wherein the determining of the updated time value associated with the substrate processing operation is based on a time value associated with the substrate processing operation, the expected total residual thickness value, and the expected material thickness value.

5. The method of claim 1, wherein the updating of the recipe comprises determining at least one of an updated radio frequency (RF) power of the substrate processing operation, an updated spacing value of the substrate processing operation, an updated gas flow value of the substrate processing operation, or an updated chamber pressure value of the substrate processing operation.

6. The method of claim 1, wherein the determining of the expected material thickness value comprises:
providing the expected total residual thickness value as input to a trained machine learning model; and
receiving, from the trained machine learning model, output associated with predictive data, wherein the expected material thickness value is associated with the predicted data.

7. The method of claim 6, wherein the trained machine learning model is trained with a data input comprising historical total residual thickness values and target output of historical material thickness values.

8. A non-transitory computer-readable storage medium storing instructions which, when executed, cause a processing device to perform operations comprising:

identifying a material associated with a substrate processing operation of a recipe;

determining an expected total residual thickness value subsequent to the substrate processing operation;

determining, based on the expected total residual thickness value, an expected material thickness value of the material associated with the substrate processing operation;

updating, based on the material and the expected material thickness value of the material, deposition operation parameters to generate an updated recipe to compensate for deposition drift; and causing a substrate to be processed based on the updated recipe.

9. The non-transitory computer-readable storage medium of claim 8, wherein the expected material thickness value is a difference between a desired material thickness value and an actual material thickness value.

10. The non-transitory computer-readable storage medium of claim 8, wherein the updating of the recipe comprises determining an updated time value associated with the substrate processing operation.

11. The non-transitory computer-readable storage medium of claim 10, wherein the determining the updated time value associated with the substrate processing operation is based on a time value associated with the substrate processing operation, the expected total residual thickness value, and the expected material thickness value.

12. The non-transitory computer-readable storage medium of claim 8, wherein the updating of the recipe comprises determining at least one of an updated radio frequency (RF) power of the substrate processing operation, an updated spacing value of the substrate processing operation, an updated gas flow value of the substrate processing operation, or an updated chamber pressure value of the substrate processing operation.

13. The non-transitory computer-readable storage medium of claim 8, wherein the determining of the expected material thickness value comprises:

providing the expected total residual thickness value as input to a trained machine learning model; and receiving, from the trained machine learning model, output associated with predictive data, wherein the expected material thickness value is associated with the predicted data.

14. The non-transitory computer-readable storage medium of claim 13, wherein the trained machine learning model is trained with a data input comprising historical total residual thickness values and target output of historical material thickness values.

15. A system comprising:

a memory; and a processing device coupled to the memory, the processing device to:

identify a material associated with a substrate processing operation of a recipe;

determine an expected total residual thickness value subsequent to the substrate processing operation;

determine, based on the expected total residual thickness value, an expected material thickness value of the material associated with the substrate processing operation;

update, based on the material and the expected material thickness value of the material, deposition operation parameters to generate an updated recipe to compensate for deposition drift; and cause a substrate to be processed based on the updated recipe.

16. The system of claim 15, wherein the expected material thickness value is a difference between a desired material thickness value and an actual material thickness value.

17. The system of claim 15, wherein to update the recipe, the processing device is to determine an updated time value associated with the substrate processing operation.

18. The system of claim 17, wherein the processing device is to determine the updated time value associated with the substrate processing operation based on a time value associated with the substrate processing operation, the expected total residual thickness value, and the expected material thickness value.

19. The system of claim 15, wherein to determine the expected material thickness value, the processing device is to:

provide the expected total residual thickness value as input to a trained machine learning model; and receive, from the trained machine learning model, output associated with predictive data, wherein the expected material thickness value is associated with the predicted data.

20. The system of claim 19, wherein the trained machine learning model is trained with a data input comprising historical total residual thickness values and target output of historical material thickness values.

* * * * *